United States Patent
Chande et al.

(10) Patent No.: US 11,622,385 B2
(45) Date of Patent: Apr. 4, 2023

(54) TECHNIQUES FOR SELECTING A MINIMUM MEASUREMENT DURATION IN LISTEN-BEFORE-TALK (LBT) SENSING SLOTS FOR HIGH BAND UNLICENSED CHANNEL ACCESS

(71) Applicant: QUALCOMM Incorporated, San Diego, CA (US)

(72) Inventors: Vinay Chande, San Diego, CA (US); Jing Sun, San Diego, CA (US); Arumugam Chendamarai Kannan, San Diego, CA (US); Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 70 days.

(21) Appl. No.: 17/384,586

(22) Filed: Jul. 23, 2021

(65) Prior Publication Data

US 2023/0025831 A1   Jan. 26, 2023

(51) Int. Cl.
*H04W 74/08* (2009.01)
*H04W 24/08* (2009.01)

(52) U.S. Cl.
CPC ....... *H04W 74/0816* (2013.01); *H04W 24/08* (2013.01); *H04W 74/0825* (2013.01)

(58) Field of Classification Search
CPC ............. H04W 74/0816; H04W 24/08; H04W 74/0825
See application file for complete search history.

*Primary Examiner* — James P Duffy
(74) *Attorney, Agent, or Firm* — Holland & Hart LLP

(57) ABSTRACT

This disclosure provides systems, methods and apparatus, including computer programs encoded on computer storage media, for selecting a minimum measurement duration in listen-before-talk (LBT) sensing slots for high band unlicensed channel access. In some examples, a device may select a minimum sensing duration for an LBT procedure according to a sensing bandwidth or an energy threshold (such as an energy detection threshold or an energy power spectral density threshold), or both. As part of the LBT procedure, the device may measure or sense a wireless channel for at least the selected minimum sensing duration in each sensing slot of the LBT procedure. The device may selectively transmit on the wireless channel according to a result of the LBT procedure. For example, the device may either transmit or refrain from transmitting on the wireless channel depending on whether the device senses the wireless channel to be available.

30 Claims, 9 Drawing Sheets

TECHNIQUES FOR SELECTING A MINIMUM MEASUREMENT DURATION IN LISTEN-BEFORE-TALK (LBT) SENSING SLOTS FOR HIGH BAND UNLICENSED CHANNEL ACCESS

TECHNICAL FIELD

This disclosure relates to wireless communications, including techniques for selecting a minimum measurement duration in listen-before-talk (LBT) sensing slots for high band unlicensed channel access.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations (BSs) or one or more network access nodes, each simultaneously supporting communication for multiple communication devices, which may be otherwise known as user equipment (UE).

In some wireless communications systems, wireless devices may contend for channel access prior to transmitting over the channel. For example, a wireless device may perform a channel access procedure to contend for access to a shared channel and the wireless device may transmit over the shared channel if the channel access procedure is successful.

SUMMARY

The systems, methods and devices of this disclosure each have several innovative aspects, no single one of which is solely responsible for the desirable attributes disclosed herein.

A method for wireless communication at a node is described. The method may include selecting a minimum sensing duration for a listen-before-talk (LBT) procedure according to at least one of a sensing bandwidth associated with the LBT procedure or an energy threshold associated with the LBT procedure, performing the LBT procedure for a wireless channel, where performing the LBT procedure includes monitoring the wireless channel for at least the selected minimum sensing duration, and selectively transmitting on the wireless channel according to a result of the LBT procedure.

An apparatus for wireless communication at a node is described. The apparatus may include a processing system, a first interface, and optionally, a second interface. The processing system may be configured to select a minimum sensing duration for an LBT procedure according to at least one of a sensing bandwidth associated with the LBT procedure or an energy threshold associated with the LBT procedure. The first interface may be configured to perform the LBT procedure for a wireless channel, where performing the LBT procedure includes monitoring, at the processing system, the wireless channel for at least the selected minimum sensing duration. The first interface or the second interface may be configured to selectively transmit on the wireless channel according to a result of the LBT procedure.

Another apparatus for wireless communication at a node is described. The apparatus may include means for selecting a minimum sensing duration for an LBT procedure according to at least one of a sensing bandwidth associated with the LBT procedure or an energy threshold associated with the LBT procedure, means for performing the LBT procedure for a wireless channel, where performing the LBT procedure includes monitoring the wireless channel for at least the selected minimum sensing duration, and means for selectively transmitting on the wireless channel according to a result of the LBT procedure.

A non-transitory computer-readable medium storing code for wireless communication at a node is described. The code may include instructions executable by a processor to select a minimum sensing duration for an LBT procedure according to at least one of a sensing bandwidth associated with the LBT procedure or an energy threshold associated with the LBT procedure, perform the LBT procedure for a wireless channel, where performing the LBT procedure includes monitoring the wireless channel for at least the selected minimum sensing duration, and selectively transmit on the wireless channel according to a result of the LBT procedure.

In some examples of the method, apparatuses, and non-transitory computer-readable medium described herein, selecting the minimum sensing duration may include operations, features, means, or instructions for calculating the minimum sensing duration using a function featuring an inverse relationship between the minimum sensing duration and at least one of the sensing bandwidth or the energy threshold.

In some examples of the method, apparatuses, and non-transitory computer-readable medium described herein, the function may be associated with an upper limit and a lower limit, and possible values for the minimum sensing duration may be between the upper limit and the lower limit.

In some examples of the method, apparatuses, and non-transitory computer-readable medium described herein, selecting the minimum sensing duration may include operations, features, means, or instructions for selecting the minimum sensing duration from a set of possible minimum sensing durations according to at least one of the sensing bandwidth or the energy threshold.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
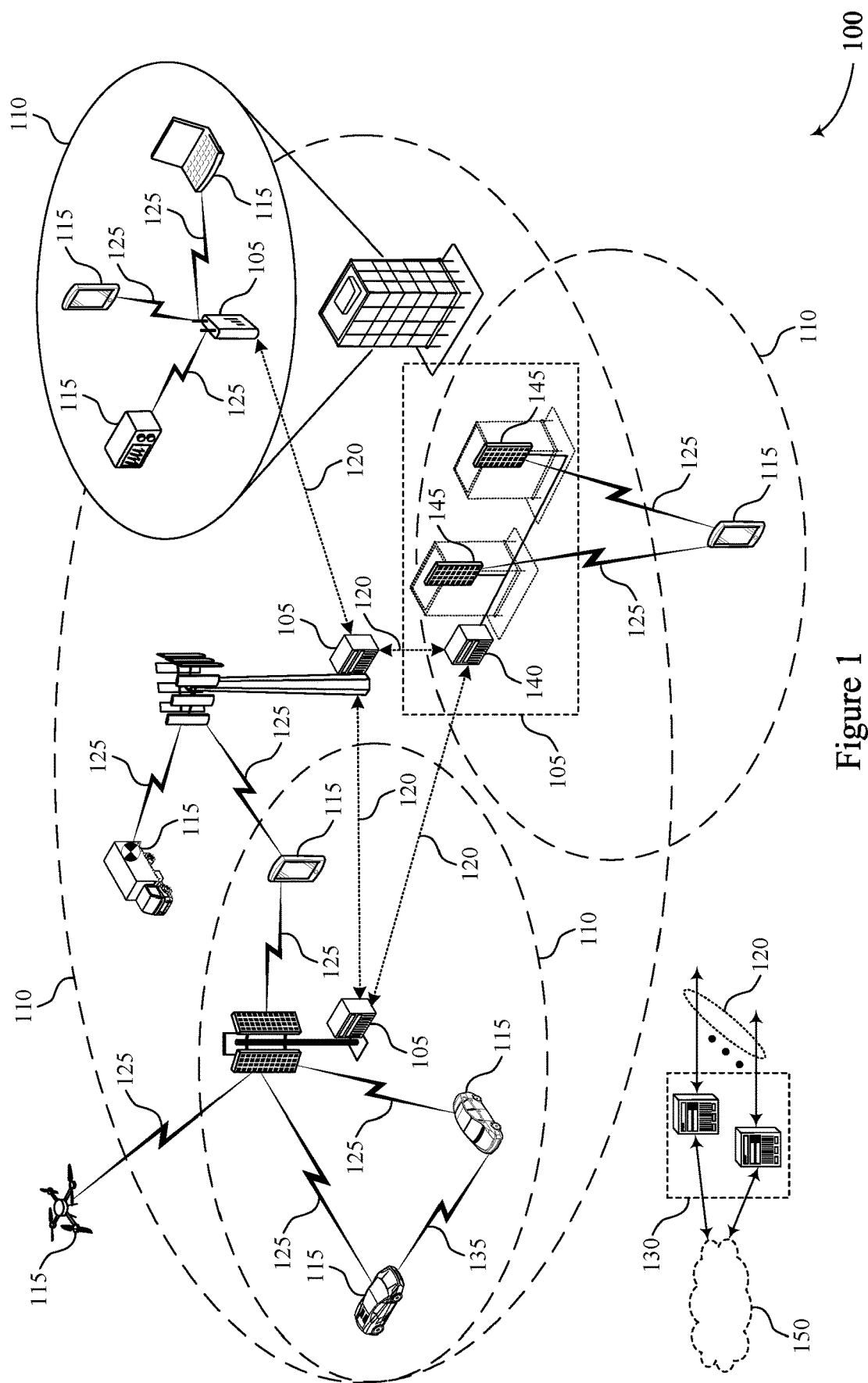
FIG. 1 illustrates an example wireless communications system that supports techniques for selecting a minimum measurement duration in listen-before-talk (LBT) sensing slots for high band unlicensed channel access.

The following description is directed to some implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

In some wireless communications systems, wireless devices or nodes may contend for access to communicate over a communication channel. For example, a wireless device may perform a channel access procedure, such as a listen-before-talk (LBT) procedure, to sense whether a channel is available and the wireless device may transmit over the channel if the wireless device senses the channel to be available (such as if the wireless device senses the channel to have an energy lower than an energy detection threshold). In some examples, and as part of the LBT procedure, the wireless device may sense the channel during specific time periods. For example, the wireless device may measure an energy of the channel during one or more sensing periods within a number of slots (as defined by the LBT procedure) and, in some examples, a reliability of the LBT procedure may be associated with a bandwidth over which the wireless device senses (which may be referred to herein as a sensing bandwidth) or the energy detection threshold to which the wireless device compares the measured energy, or both.

In some implementations of the present disclosure, the wireless device may sense the channel for at least a minimum sensing duration in accordance with the sensing bandwidth or the energy detection threshold, or both. For example, the minimum sensing duration during which the wireless device may sense the channel (such as a minimum duration for a sensing period in a sensing slot) may depend on or vary with the sensing bandwidth or the energy detection threshold, or both. As described herein, such a minimum sensing duration may refer to a minimum length of a sensing period within an observation slot and to a minimum length of a sensing period (or multiple sensing periods) within a deferral slot. In some implementations, the minimum sensing duration may be inversely related to the sensing bandwidth or the energy detection threshold, or both, such that as the sensing bandwidth or the energy detection threshold increases, the minimum sensing duration decreases. In some examples, the minimum sensing duration may vary as a continuous function of sensing bandwidth or energy detection threshold, such that each sensing bandwidth or energy detection threshold corresponds to a different minimum sensing duration (within an upper bound and a lower bound). In some other examples, the minimum sensing duration may vary across a set of discrete values, each discrete value of the set of discrete values corresponding to a range of sensing bandwidths or a range of energy threshold values.

Particular implementations of the subject matter described in this disclosure can be implemented to realize one or more of the following potential advantages. For example, as a result of using such a minimum sensing duration that varies with the sensing bandwidth or the energy detection threshold, or both, wireless devices may sense the channel for an appropriate or sufficient amount of time for a given sensing bandwidth or energy detection threshold, which may increase the reliability of the LBT procedure while still providing sufficient time within a sensing slot during which the wireless device may perform processing tasks or switch to an operating configuration for transmitting. Thus, such wireless devices may experience more reliable contention-based channel access, mitigating the waste of communication resources and enhancing the reliability of communications. Further, and as a result thereof, the wireless devices may experience greater spectral efficiency, greater system throughput, and higher data rates. Further, the described techniques may feature enhanced coexistence with other channel access or LBT procedures, such that some devices may implement a variable minimum sensing duration while some other devices may implement a fixed minimum sensing duration, which may support greater system flexibility.

Additionally, or alternatively, in wireless communications systems configured to perform channel sensing procedures over multiple beams, wireless devices may switch sensing beams (for example, during a fixed duration of an observation slot) and may obtain sensing results on each beam separately. For example, a wireless device may select a sensing duration in accordance with a high sensing bandwidth (for example, a relatively small sensing duration as compared to a sensing duration corresponding to a low sensing bandwidth). In such cases, the wireless device may select the sensing duration to be small enough such that, within a fixed duration such as a sensing duration of an observation slot, the wireless device may perform channel sensing procedures using a first beam and then switch to a second beam to perform channel sensing procedures. As such, the wireless device may select the sensing duration in accordance with the sensing bandwidth and an energy detection threshold as well as in accordance with a number of beams configured for sensing procedures at the wireless device.

Further, shorter sensing durations at higher bandwidths may allow wireless devices to detect whether the channel is busy earlier as compared to using longer sensing durations. Hence, the wireless devices may have more available time before a detection slot (for example, an observation slot) ends. In such cases, wireless devices that gain access to the channel at the end of the detection slot may use the remaining time available within the detection slot to perform tasks such as complex decision making for scheduling and transmitting communications.

FIG. 1 illustrates an example wireless communications system 100 that supports techniques for selecting a minimum measurement duration in LBT sensing slots for high band unlicensed channel access. The wireless communications system 100 may include one or more base stations (BSs) 105, one or more UEs 115, and a core network 130. In some implementations, the wireless communications system 100 may be a Long Term Evolution (LTE) network, an LTE-Advanced (LTE-A) network, an LTE-A Pro network, or a New Radio (NR) network. In some implementations, the wireless communications system 100 may support enhanced broadband communications, ultra-reliable (for example, mission critical) communications, low latency communications, communications with low-cost and low-complexity devices, or any combination thereof.

The BSs 105 may be dispersed throughout a geographic area to form the wireless communications system 100 and may be devices in different forms or having different capabilities. The BSs 105 and the UEs 115 may wirelessly communicate via one or more communication links 125. Each BS 105 may provide a geographic coverage area 110 over which the UEs 115 and the BS 105 may establish one or more communication links 125. The geographic coverage area 110 may be an example of a geographic area over which a BS 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the BSs 105, or network equipment (for example, core network nodes, relay devices, integrated access and backhaul (IAB) nodes, or other network equipment), as shown in FIG. 1.

The BSs 105 may communicate with the core network 130, or with one another, or both. For example, the BSs 105 may interface with the core network 130 through one or more backhaul links 120 (for example, via an S1, N2, N3, or another interface). The BSs 105 may communicate with one another over the backhaul links 120 (for example, via an X2, Xn, or another interface) either directly (for example, directly between BSs 105), or indirectly (for example, via core network 130), or both. In some implementations, the backhaul links 120 may be or include one or more wireless links.

One or more of the BSs 105 described herein may include or may be referred to by a person having ordinary skill in the art as a base transceiver station, a radio BS, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" also may be referred to as a unit, a station, a terminal, or a client, among other examples. A UE 115 also may include or may be referred to as a personal electronic device such as a cellular phone, a personal digital assistant (PDA), a tablet computer, a laptop computer, or a personal computer. In some implementations, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other implementations.

The UEs 115 described herein may be able to communicate with various types of devices, such as other UEs 115 that may sometimes act as relays as well as the BSs 105 and the network equipment including macro eNBs or gNBs, small cell eNBs or gNBs, or relay BSs, among other implementations, as shown in FIG. 1.

The UEs 115 and the BSs 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some implementations (for example, in a carrier aggregation configuration), a carrier also may have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (for example, of the same or a different radio access technology).

The communication links 125 shown in the wireless communications system 100 may include uplink transmissions from a UE 115 to a BS 105, or downlink transmissions from a BS 105 to a UE 115. Carriers may carry downlink or uplink communications (for example, in an FDD mode) or may be configured to carry downlink and uplink communications (for example, in a TDD mode).

A carrier may be associated with a particular bandwidth of the radio frequency spectrum, and in some implementations the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 megahertz (MHz)). Devices of the wireless communications system 100 (for example, the BSs 105, the UEs 115, or both) may have hardware configurations that support communications over a particular carrier bandwidth or may be configurable to support communications over one of a set of carrier bandwidths. In some implementations, the wireless communications system 100 may include BSs 105 or UEs 115 that support simultaneous communications via carriers associated with multiple carrier bandwidths. In some implementations, each served UE 115 may be configured for operating over portions (for example, a sub-band, a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (for example, a duration of one modulation symbol) and one subcarrier, where the symbol period and subcarrier spacing are inversely related. The quantity of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some implementations, a UE 115 may be configured with multiple BWPs. In some implementations, a single BWP for a carrier may be active at a given time and communications for the UE 115 may be restricted to one or more active BWPs.

The time intervals for the BSs 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some implementations, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some implementations, the TTI duration (for example, the number of symbol periods in a TTI) may be variable. Additionally, or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

Each BS 105 may provide communication coverage via one or more cells, for example a macro cell, a small cell, a hot spot, or other types of cells, or any combination thereof.

The term "cell" may refer to a logical communication entity used for communication with a BS 105 (for example, over a carrier) and may be associated with an identifier for distinguishing neighboring cells (for example, a physical cell identifier (PCID), a virtual cell identifier (VCID), or others). In some implementations, a cell also may refer to a geographic coverage area 110 or a portion of a geographic coverage area 110 (for example, a sector) over which the logical communication entity operates. Such cells may range from smaller areas (for example, a structure, a subset of structure) to larger areas depending on various factors such as the capabilities of the BS 105. For example, a cell may be or include a building, a subset of a building, or exterior spaces between or overlapping with geographic coverage areas 110, among other implementations.

A macro cell generally covers a relatively large geographic area (for example, several kilometers in radius) and may allow unrestricted access by the UEs 115 with service subscriptions with the network provider supporting the macro cell. A small cell may be associated with a lower-powered BS 105, as compared with a macro cell, and a small cell may operate in the same or different (for example, licensed, unlicensed) frequency bands as macro cells. Small cells may provide unrestricted access to the UEs 115 with service subscriptions with the network provider or may provide restricted access to the UEs 115 having an association with the small cell (for example, the UEs 115 in a closed subscriber group (CSG), the UEs 115 associated with users in a home or office). A BS 105 may support one or multiple cells and also may support communications over the one or more cells using one or multiple component carriers.

In some implementations, a carrier may support multiple cells, and different cells may be configured according to different protocol types (for example, MTC, narrowband IoT (NB-IoT), enhanced mobile broadband (eMBB)) that may provide access for different types of devices.

In some implementations, a BS 105 may be movable and therefore provide communication coverage for a moving geographic coverage area 110. In some implementations, different geographic coverage areas 110 associated with different technologies may overlap, but the different geographic coverage areas 110 may be supported by the same BS 105. In some other implementations, the overlapping geographic coverage areas 110 associated with different technologies may be supported by different BSs 105. The wireless communications system 100 may include, for example, a heterogeneous network in which different types of the BSs 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some implementations, a UE 115 also may be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a BS 105. Other UEs 115 in such a group may be outside the geographic coverage area 110 of a BS 105 or be otherwise unable to receive transmissions from a BS 105. In some implementations, groups of the UEs 115 communicating via D2D communications may utilize a one-to-many (1-M) system in which each UE 115 transmits to every other UE 115 in the group. In some implementations, a BS 105 facilitates the scheduling of resources for D2D communications. In some other implementations, D2D communications are carried out between the UEs 115 without the involvement of a BS 105.

In some implementations, the D2D communication link 135 may be an example of a communication channel, such as a sidelink communication channel, between vehicles (for example, UEs 115). In some implementations, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some implementations, vehicles in a V2X system may communicate with roadside infrastructure, such as roadside units, or with the network via one or more network nodes (for example, BSs 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the BSs 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a BS 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or BS 105 may be distributed across various network devices (for example, radio heads and ANCs) or consolidated into a single network device (for example, a BS 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 also may operate in a super high frequency (SHF) region using frequency bands from 3 GHz to 30 GHz, also known as the centimeter band, or in an extremely high frequency (EHF) region of the spectrum (for example, from 30 GHz to 300 GHz), also known as the millimeter band. In some implementations, the wireless communications system 100 may support millimeter wave (mmW) communications between the UEs 115 and the BSs 105, and EHF antennas of the respective devices may be smaller and more closely spaced than UHF antennas. In some implementations, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the BSs 105 and the UEs 115 may employ carrier sensing for collision detection and avoidance. In some implementations, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other transmissions.

A BS 105 or a UE 115 may be equipped with multiple antennas, which may be used to employ techniques such as transmit diversity, receive diversity, multiple-input multiple-output (MIMO) communications, or beamforming. The antennas of a BS 105 or a UE 115 may be located within one or more antenna arrays or antenna panels, which may support MIMO operations or transmit or receive beamforming. For example, one or more BS antennas or antenna arrays may be co-located at an antenna assembly, such as an antenna tower. In some implementations, antennas or antenna arrays associated with a BS 105 may be located in diverse geographic locations. A BS 105 may have an antenna array with a number of rows and columns of antenna ports that the BS 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which also may be referred to as spatial filtering, directional transmission, or directional reception, is a signal processing technique that may be used at a transmitting device or a receiving device (for example, one or more components of a BS 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A BS 105 or a UE 115 may use beam sweeping techniques as part of beam forming operations. For example, a BS 105 may use multiple antennas or antenna arrays (for example, antenna panels) to conduct beamforming operations for directional communications with a UE 115. Some signals (for example, synchronization signals, reference signals, beam selection signals, or other control signals) may be transmitted by a BS 105 multiple times in different directions. For example, the BS 105 may transmit a signal according to different beamforming weight sets associated with different directions of transmission. Transmissions in different beam directions may be used to identify (for example, by a transmitting device, such as a BS 105, or by a receiving device, such as a UE 115) a beam direction for later transmission or reception by the BS 105.

Some signals, such as data signals associated with a particular receiving device, may be transmitted by a BS 105 in a single beam direction (for example, a direction associated with the receiving device, such as a UE 115). In some implementations, the beam direction associated with transmissions along a single beam direction may be determined based on a signal that was transmitted in one or more beam directions. For example, a UE 115 may receive one or more of the signals transmitted by the BS 105 in different directions and may report to the BS 105 an indication of the signal that the UE 115 received with a highest signal quality or an otherwise acceptable signal quality.

In some implementations, transmissions by a device (for example, by a BS 105 or a UE 115) may be performed using multiple beam directions, and the device may use a combination of digital precoding or radio frequency beamforming to generate a combined beam for transmission (for example, from a BS 105 to a UE 115). The UE 115 may report feedback that indicates precoding weights for one or more beam directions, and the feedback may correspond to a configured number of beams across a system bandwidth or one or more sub-bands. The BS 105 may transmit a reference signal (for example, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted in one or more directions by a BS 105, a UE 115 may employ similar techniques for transmitting signals multiple times in different directions (for example, for identifying a beam direction for subsequent transmission or reception by the UE 115) or for transmitting a signal in a single direction (for example, for transmitting data to a receiving device).

A receiving device (for example, a UE 115) may try multiple receive configurations (for example, directional listening) when receiving various signals from the BS 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some implementations, a receiving device may use a single receive configuration to receive along a single beam direction (for example, when receiving a data signal). The single receive configuration may be aligned in a beam direction determined based on listening according to different receive configuration directions (for example, a beam direction determined to have a highest signal strength, highest signal-to-noise ratio (SNR), or otherwise acceptable signal quality based on listening according to multiple beam directions).

As described herein, a BS 105 may include components that are located at a single physical location or components located at various physical locations. In examples in which the BS 105 includes components that are located at various physical locations, the various components may each perform various functions such that, collectively, the various components achieve functionality that is similar to a BS 105 that is located at a single physical location. As such, a BS 105 described herein may equivalently refer to a standalone BS 105 or a BS 105 including components that are located at various physical locations. In some implementations, such a BS 105 including components that are located at various physical locations may be referred to as or may be associated with a disaggregated radio access network (RAN) architecture, such as an Open RAN (O-RAN) or Virtualized RAN (VRAN) architecture.

In some examples, a wireless device or a node (such as a UE 115 or one or more components of a BS 105) within the wireless communications system 100 may use a shared spectrum or a shared channel for communication with other wireless devices or nodes and such a wireless device or node may perform a channel access procedure, such as an LBT procedure, prior to transmitting over the shared spectrum or the shared channel to avoid experiencing interference with other signaling from other devices. As part of an LBT procedure, the wireless device or node (such as the UE 115 or the one or more components of the BS 105) may measure or sense the shared spectrum or the shared channel for at least a minimum sensing duration. For example, the wireless device or node may measure or sense the shared spectrum or the shared channel for at least the minimum sensing duration during each of a number of sensing slots (such as observation slots, deferral slots, or any combination thereof).

In some implementations, a length of the minimum sensing duration may be defined in accordance with a sensing bandwidth (a variable sensing bandwidth) or an energy threshold (a variable sensing bandwidth), or both. In other words, for example, the wireless device or node may set or configure the minimum sensing duration in accordance with a bandwidth over which the wireless device or node performs channels sensing or in accordance with an energy threshold (such as energy detection threshold or an energy power spectral density threshold) to which the wireless device or node compares a measured energy. In implementations in which the minimum sensing duration depends on the sensing bandwidth, the minimum sensing duration may be inversely related to the sensing bandwidth. Similarly, in implementations in which the minimum sensing duration depends on the energy threshold, the minimum sensing interval may be inversely related to the energy threshold.

Figure 2:
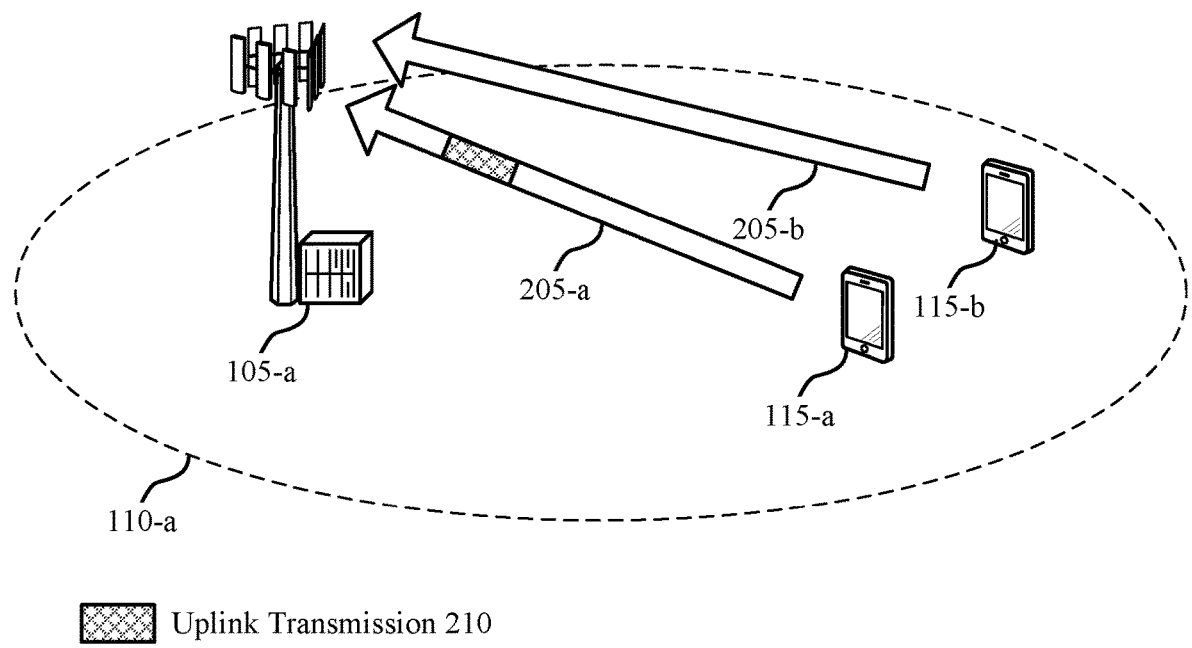
FIG. 2 illustrates an example signaling diagram that supports techniques for selecting a minimum measurement duration in LBT sensing slots for high band unlicensed channel access.

FIG. 2 illustrates an example signaling diagram 200 that supports techniques for selecting a minimum measurement duration in LBT sensing slots for high band unlicensed channel access. The signaling diagram 200 illustrates communication between a UE 115-a, a UE 115-b, and a BS 105-a, which may be examples of corresponding devices described herein, including UEs 115 and BSs 105 as described with reference to FIG. 1. The UE 115-a, the UE 115-b, and the BS 105-a may perform or otherwise support contention-based communication within a geographic coverage area 110-a. In some implementations, and as part of the contention-based communication, the UE 115-a, the UE 115-b, one or more components of the BS 105-a, or any combination thereof, may measure or sense a channel for at least a minimum sensing duration over a number of slots associated with a channel access procedure, such as an LBT procedure, and such a minimum sensing duration may depend on a bandwidth over which the sensing device (the UE 115-a, the UE 115-b, or the BS 105-a) measures a channel energy or an energy threshold to which the sensing device compares the measured energy, or both.

For example, the UE 115-a may perform uplink communication with one or more components of the BS 105-a via a communication link 205-a and the UE 115-b may perform uplink communication with one or more components of the BS 105-a via a communication link 205-b and, in some examples, both the communication link 205-a and the communication link 205-b may be examples of or may be associated with a shared channel (such as a channel that is shared between the UE 115-a and the UE 115-b). In some examples, the communication link 205-a or the communication link 205-b, or both, may support communication over an unlicensed radio frequency spectrum (such as the radio frequency spectrum between 52 GHz and 71 GHz, including unlicensed mmW bands at or near 60 GHz).

The UE 115-a, the UE 115-b, or the BS 105-a may contend for access to communicate over such a shared channel via a channel access procedure, such as via an LBT procedure. A wireless device or node (such as the UE 115-a, the UE 115-b, or one or more components of the BS 105-a) may acquire such a shared channel (which may be equivalently referred to herein as a shared radio frequency channel or a shared spectrum) via a successful LBT procedure, which may indicate that the shared channel is available. For example, the UE 115-a may acquire (gain access to) the shared channel as a result of performing a successful LBT procedure and, as a result of acquiring the shared channel, the UE 115-*a* may transmit an uplink transmission 210 to the BS 105-*a* over the communication link 205-*a*.

In some examples, the UE 115-*a* may perform the LBT procedure prior to transmitting to avoid interference with other signaling. As part of performing the LBT procedure, for example, the UE 115-*a* may measure or sense whether the shared channel is occupied (by another transmitting device) as a result of comparing energy sensing measurements to one or more thresholds. For instance, the UE 115-*a* may obtain an energy detection measurement as a result of measuring or sensing the shared channel and the UE 115-*a* may compare the energy detection measurement to an energy threshold. If the energy detection measurement fails to satisfy (exceeds or equals) an energy detection threshold, the UE 115-*a* may sense or otherwise determine that the shared channel is occupied by another device, such as the UE 115-*b*. In such examples in which the UE 115-*a* senses the channel to be occupied by another device, the UE 115-*a* may refrain from transmitting the uplink transmissions 210 to the BS 105-*a*.

Alternatively, if the energy detection measurement satisfies (is less than or equals) the energy detection threshold, the UE 115-*a* may sense or otherwise determine that the shared channel is available for use by the UE 115-*a* and, accordingly, the UE 115-*a* may transmit the uplink transmission 210 to the BS 105-*a*. In other words, the UE 115-*a* may perform sensing and decision (on whether the energy detection measurement satisfies the energy detection threshold) followed by a transmission (such as in a 5 µs slot) if the UE 115-*a* decides that the energy detection measurement does satisfy the energy detection threshold.

In some examples, contention-based wireless communications systems may employ slot-based communication according to which wireless devices or nodes may contend for channel access on a slot-by-slot basis. For example, the UE 115-*a* may perform a slot-based LBT procedure to gain access to the shared channel (which may be equivalently referred to as a channel medium). An LBT procedure may be defined according to multiple categories. Examples of LBT categories include a category one LBT (CAT1 LBT), a category two LBT (CAT2 LBT), a category three LBT (CAT3 LBT), and a category four LBT (CAT4 LBT). A CAT2 LBT may be an example of a channel sensing procedure without a random "backoff" (such as a timing backoff following detection of channel occupancy, or the like). A CAT3 LBT may be an example of a channel sensing procedure with a random backoff and a fixed size contention window. A CAT4 LBT may be an example of a channel sensing procedure with a random backoff and a variable size contention window.

As part of an LBT procedure, the sensing device (which may be equivalently referred to herein as an initiating device) may perform 8 µs and (up to) 3×5 µs of channel sensing prior to initiating, entering, or otherwise occupying a channel occupancy time (COT). A responding or receiving device (such as the device to which the sensing or initiating device transmits to) may refrain from performing an LBT procedure. In some examples, some signaling may be exempt from channel sensing. For example, short control signaling may be exempt from channel sensing such that an initiating device may refrain from measuring or sensing a channel prior to transmitting such short control signaling.

In some examples, the UE 115-*a* may perform an LBT procedure prior to transmitting a configured grant (CG) uplink (CG-UL), a physical random access channel (PRACH) preamble, a radio resource control (RRC) configured physical uplink control channel (PUCCH) message, or any other transmissions that the UE 115-*a* may send to the BS 105-*a*. As part of an LBT procedure, a wireless device or node (such as the UE 115-*a*) may perform energy sensing measurements during specific time periods (such as during specific time periods within one or more deferral slots or one or more observation slots). For example, the UE 115-*a* may perform an energy detection measurement during one or more sensing periods within a deferral slot (such as a slot following a backoff). Additionally, or alternatively, the UE 115-*a* may perform an energy detection measurement during a sensing period within an observation slot. In some examples, a constraint on measurements may provide a sufficient processing time in the observation slot (such as for processing a measured energy and for comparing the measured energy to an energy detection threshold). In other words, a tradeoff may exist between measurement reliability (associated with longer sensing periods or measurement durations) and remaining time for sensing and transmission switching. Such deferral slots and observation slots are illustrated by and described in more detail with reference to FIGS. 3A, 3B, and 3C.

In some implementations, channel access procedures may be subject to or otherwise associated with one or more reliability factors. Such one or more reliability factors may include or be associated with a value of an energy detection threshold or a sensing bandwidth. For example, for a first, relatively higher energy detection threshold, the UE 115-*a* may experience a greater likelihood of failing to detect that the channel is busy while also experiencing a lower likelihood of detecting a false alarm. In other words, the first energy detection threshold may be relatively higher (as compared to an ambient interference, an interference floor, or the power of other received signals), such that even if the channel is occupied by another wireless device, the UE 115-*a* may sense the channel to be free as a result of comparing an energy detection measurement to the relatively higher first energy detection threshold.

In some other examples, for a second, relatively lower energy detection threshold, the UE 115-*a* may experience a greater likelihood of falsely sensing that the channel is busy while also experiencing a lower likelihood of missing detection of an interferer (such as the UE 115-*b*). For example, the second energy detection threshold may be relatively lower (as compared to an average ambient interference, or an interference floor), such that even if the channel is not occupied, the UE 115-*a* may sense the channel to be busy as a result of comparing an energy detection measurement to the relatively lower second energy detection threshold. As such, a missed detection may have a limited penalty of increased interference while a false alarm may have a (relatively higher) penalty of wasted resources, and changing or adjusting the minimum measurement duration constraint according to the energy detection threshold may equalize false alarm probabilities across scenarios with different energy detection thresholds.

Additionally, or alternatively, the reliability of channel measurements made during a channel access procedure may be associated with an amount of data accumulated by the channel measurements. For example, the UE 115-*a* may be configured with a sensing bandwidth (such as a bandwidth dedicated to channel measurements) or a sensing time interval (such as a time period dedicated to channel measurements), or both, and increasing the sensing bandwidth or the sensing time interval, or both, may result in the UE 115-*a* accumulating more data. As such, the UE 115-*a* may obtain more accurate channel measurements and experience more reliable channel occupancy determination.

In some implementations, a wireless device or node, such as the UE 115-a, may perform energy sensing measurements on multiple beams. For example, the UE 115-a may be configured to transmit uplink information to the BS 105-a using two uplink beams. In such examples, the UE 115-a may select a sensing duration in accordance with the minimum sensing duration, such that the UE 115-a may perform an energy sensing measurement using a first uplink beam, switch to a second uplink beam, and perform another energy sensing measurement. In some examples, the UE 115-a may select the sensing duration to be small enough such that the UE 115-a may perform energy sensing measurements with the first uplink beam and the second uplink beam during a same slot (for example, a same observation slot). For example, the UE 115-a and the BS 105-a may communicate using a relatively high bandwidth such that the UE 115-a may utilize a relatively small sensing duration when selecting a sensing duration for energy sensing measurements. As such, in some examples, the UE 115-a may select a sensing duration short enough such that the UE 115-a may perform energy sensing measurements with the first uplink beam and the second uplink beam during the same observation slot. The UE 115-a may select the same sensing duration for the first uplink beam and the second uplink beam or the UE 115-a may select different sensing durations for the first uplink beam and the second uplink beam. In some examples, the UE 115-a may communicate with the BS 105-a with any number of beams, and as such, the UE 115-a may select a sensing duration in accordance with the number of beams such that the UE 115-a may perform energy sensing measurements with each beam during a same slot (for example, a same observation slot).

In some implementations, a wireless device or node, such as the UE 115-a, perform energy sensing measurements for at least a minimum sensing duration in accordance with a variable sensing bandwidth or a variable energy threshold, or both. In other words, for example, the UE 115-a may define, configure, or otherwise set a length or duration of a sensing period within an observation slot or a deferral slot, or both, in accordance with the minimum sensing duration (for example, such that the sensing period is greater than or equal to the minimum sensing duration). In some examples, the minimum sensing duration as described herein may refer to a first minimum sensing duration (such as a duration of z µs) for a first sensing period within an observation slot (a 5 µs observation slot) and a second minimum sensing duration (such as durations of x, z µs) for two sensing periods within a deferral slot (such as an 8 µs deferral slot). Additionally, or alternatively, the minimum sensing duration as described herein may refer to a combination of the first minimum sensing duration for the first sensing period within the observation slot and the second minimum sensing duration for the second sensing period within the deferral slot or any one or more values or parameters that the UE 115-a may use to obtain, calculate, or otherwise determine the first minimum sensing duration for the first sensing period within the observation slot and the second minimum sensing duration for the second sensing period within the deferral slot.

In some implementations, the UE 115-a may define, configure, set, or otherwise identify the minimum sensing duration in accordance with a sensing bandwidth. In some implementations, the minimum sensing duration may be inversely related to the sensing bandwidth. In some examples, for instance, the UE 115-a may define, configure, set, or otherwise identify the minimum sensing duration using a continuous function featuring an inverse relation between minimum sensing duration and sensing bandwidth (within an upper and lower bound). Alternatively, in some other examples, the UE 115-a may define, configure, set, or otherwise identify the minimum sensing duration using a set of decreasing discrete values, each value corresponding to a different range of increasing sensing bandwidths. Additional details relating to such a sensing bandwidth-dependent minimum sensing duration are illustrated by and described with reference to FIGS. 4A and 4B.

Additionally, or alternatively, the UE 115-a may define, configure, set, or otherwise identify the minimum sensing duration in accordance an energy threshold. In some implementations, the minimum sensing duration may be inversely related to the energy threshold. In some examples, for instance, the UE 115-a may define, configure, set, or otherwise identify the minimum sensing duration using a continuous function featuring an inverse relation between minimum sensing duration and energy threshold (within an upper and lower bound). Alternatively, in some other examples, the UE 115-a may define, configure, set, or otherwise identify the minimum sensing duration using a set of decreasing discrete values, each value corresponding to a different range of increasing energy thresholds. Additional details relating to such an energy threshold-dependent minimum sensing duration are illustrated by and described with reference to FIGS. 5A and 5B.

As such, the UE 115-a may implement or follow a minimum sensing duration for setting a length of one or more sensing periods of an LBT procedure and such a minimum sensing duration may support or be associated with an acquisition of sufficient measurement data during the one or more sensing periods in line with the sensing bandwidth or the energy threshold that the UE 115-a uses for performing the LBT procedure. In other words, as a result of measuring or sensing the shared channel for at least the minimum sensing duration, the UE 115-a may acquire a sufficient amount of accurate or reliable channel measurement data, which may result in more accurate and reliable LBT procedures. Thus, configuring devices to perform energy measurements on contended channels in accordance with such a minimum sensing duration may provide for more reliable contention-based access, a potentially smaller waste of communication resources, and greater reliability of communication between devices in the system.

Figure 3A:
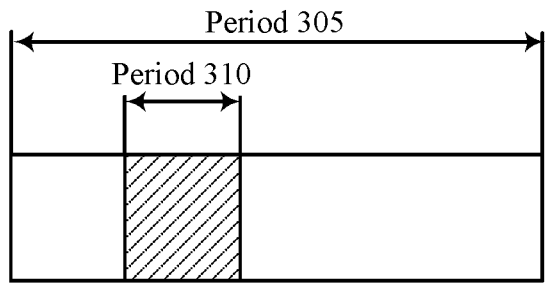
FIGS. 3A, 3B, and 3C illustrate example structures that support techniques for selecting a minimum measurement duration in LBT sensing slots for high band unlicensed channel access.
Figure 3B:
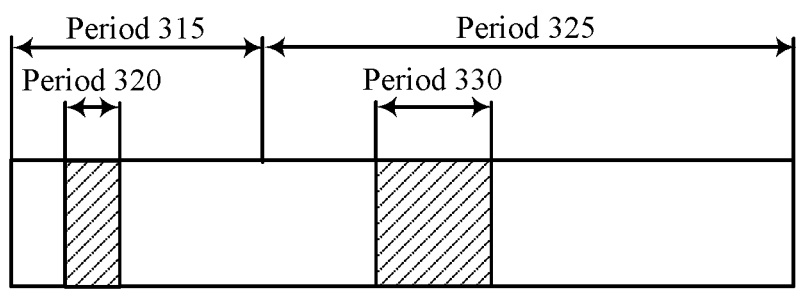
Figure 3C:
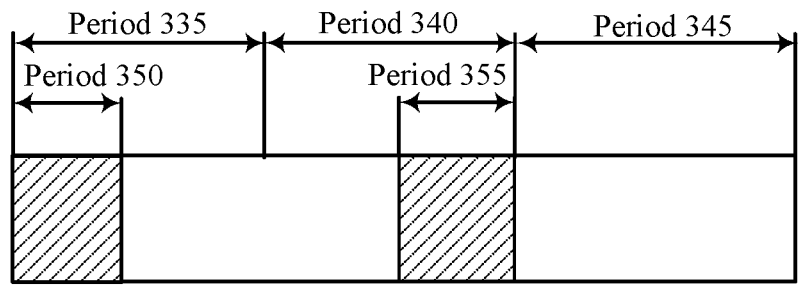

FIGS. 3A, 3B, and 3C illustrate example sensing structures 300, 301, and 302, respectively, that support techniques for selecting a minimum measurement duration in LBT sensing slots for high band unlicensed channel access. Wireless devices or nodes, such as UEs 115 and BSs 105 as described with reference to FIGS. 1 and 2, may perform LBT procedures according to one or more of the sensing structures 300, 301, or 302. In some implementations, a sensing device (for example, a device performing a channel access or LBT procedure) may define, configure, or set a duration of sensing periods within the sensing structures 300, 301, or 302 in accordance with a minimum sensing duration that is a function of one or both of a sensing bandwidth or an energy threshold.

In some examples, the sensing device may be configured to perform a channel access procedure, such as an LBT procedure, in a contention-based communications system. For example, the sensing device may perform any category LBT procedure (such as a CAT 2 LBT or a CAT 4 LBT procedure), according to which the sensing device may perform energy sensing measurements during one or more deferral slots and observation slots (which may be equivalently referred to herein as contention slots). In such examples, the sensing device (a device that is initiating a channel access procedure) may perform channel sensing during one or more sensing periods within deferral slots and observation slots, as illustrated by and described with reference to the sensing structures 300, 301, and 302.

In FIG. 3A, the sensing structure 300 illustrates a channel sensing configuration according to which the sensing device may perform energy sensing measurements during an observation slot. The sensing structure 300 may include an observation slot with a time period 305. In some examples, the time period 305 may be a predefined value (such as 5 µs), a dynamic value (such as a value selected by or indicated to the sensing device), or any other period of time associated with observation slots. The sensing structure 300 may further include a sensing period spanning a time period 310. In some examples, the time period 310 may represent an amount of time during which the sensing device performs energy sensing measurements on a shared channel (measures or senses the shared channel) as part of an LBT procedure. In some examples, the time period 310 may be understood as a quantity of z µs and may be greater than or equal to a minimum sensing duration. In some implementations, for example, the minimum sensing duration may define a minimum quantity of z µs during which the sensing device measures or senses the shared channel within an observation slot.

In some examples, the sensing device may be configured to measure or sense the shared channel during one or more observation slots. For example, the sensing device may be configured to sense the shared channel for a quantity of observation slots prior to transmitting over the shared channel. In examples in which the sensing device performs an energy sensing measurement and the energy sensing measurement fails to satisfy (exceeds or is equal to) an energy detection threshold, the sensing device may cease performing energy sensing measurements for a duration of a backoff period. Upon expiration of the backoff period, the sensing device may perform channel sensing during one or more deferral periods, as illustrated by and described with reference to FIGS. 3B and 3C.

In FIG. 3B, for example, the sensing structure 301 illustrates a channel sensing configuration according to which the sensing device may perform energy sensing measurements during a deferral slot. The sensing structure 301 may include two portions of a deferral slot, where a first portion spans a time period 315 and a second portion spans a time period 325. In some examples, the time period 315 may be a predefined value (such as 3 µs), a dynamic value (such as a value selected by or indicated to the sensing device), or any other period associated with observation slots. Additionally, or alternatively, the time period 325 may be a predefined value (such as 5 µs), a dynamic value (such as a value selected by or indicated to the sensing device), or any other period associated with deferral slots. The sensing structure 301 may further include one or more sensing periods and the sensing device may perform energy sensing measurements during some (or all) of the one or more sensing periods. Sensing periods may be located at any time within the first portion of the deferral slot or the second portion of the deferral slot, or both.

In the example of the sensing structure 301, the first portion of the deferral slot may include a sensing period spanning a time period 320 and the second portion of the deferral slot may include a sensing period spanning a time period 330. In some examples, the time period 320 may be understood as a quantity of x µs and the time period 330 may be understood as a quantity of z µs and, collectively or individually, the time period 320 and the time period 330 may be greater than or equal to the minimum sensing duration. In some implementations, for example, the minimum sensing duration may separately indicate or refer to a minimum amount of x µs and a minimum amount of z µs. Alternatively, in some other implementations, the minimum sensing duration may collectively indicate or refer to a minimum total of or summation of x µs and of z µs.

In FIG. 3C, the sensing structure 302 supports a channel sensing configuration according to which the sensing device may perform energy sensing measurements during a deferral slot (such as a 2-look 8 µs deferral slot, which may be useful for catching asynchronous transmitters). The sensing structure 302 may include three portions of a deferral slot, where a first portion spans a time period 335, a second portion spans a time period 340, and a third portion spans a time period 345. In some examples, the time period 335 may be a predefined value (such as 2.5 µs), a dynamic value (such as a value selected by or indicated to the sensing device), or any other period associated with observation slots. Additionally, or alternatively, the time period 340 may be a predefined value (such as 2.5 µs), a dynamic value (such as selected by or indicated to the sensing device), or any other period associated with deferral slots. Additionally, or alternatively, the time period 345 may be a predefined value (such as 3 µs), a dynamic value (such as selected by or indicated to the sensing device), or any other period associated with deferral slots. The sensing structure 302 may further include one or more sensing periods and the sensing device may perform energy sensing measurements during some (or all) of the one or more sensing periods. Sensing periods may be located at any time within the first portion of the deferral slot, the second portion of the deferral slot, the third portion of the deferral slot, or any combination thereof.

In the example of the sensing structure 302, the first portion of the deferral slot may include a sensing period spanning a time period 350 and the second portion of the deferral slot may include a sensing period spanning a time period 355. In some examples, the time period 350 may be understood as a quantity of x µs and the time period 355 also may be understood as a quantity of x µs and, collectively or individually, the time period 350 and the time period 355 may be greater than or equal to the minimum sensing duration. In some implementations, for example, the minimum sensing duration may indicate or refer to a minimum amount of x µs. Alternatively, in some other implementations, the minimum sensing duration may collectively indicate or refer to a minimum total of or summation of the two x µs sensing periods.

Although described in terms of observation slots and deferral slots, the sensing device initiating a contention based channel access procedure (such as an LBT procedure) may perform channel sensing for at least the minimum sensing duration during a slot associated with any type of random access procedure (including during slots that may be referred to as contention slots, sensing slots, or any other type of slot). In some examples, the minimum sensing duration may vary as a function of a sensing bandwidth or an energy threshold, or both. Additional details relating to how the minimum sensing duration may vary as a function of the sensing bandwidth are illustrated by and described with reference to FIGS. 4A and 4B, while additional details relating to how the minimum sensing duration may vary as a function of the energy threshold are illustrated by and described with reference to FIGS. 5A and 5B.

Figure 4A:
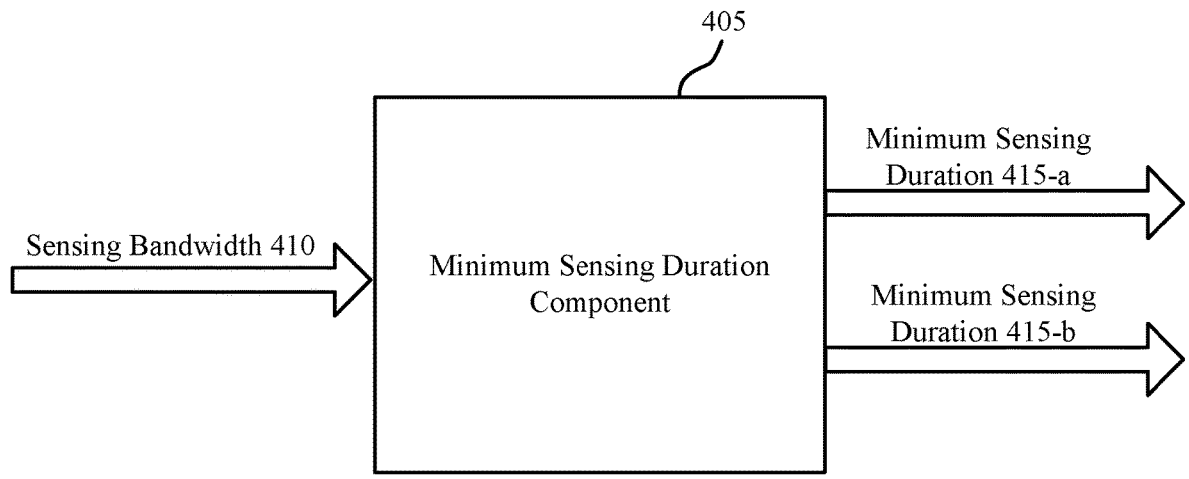
FIGS. 4A and 4B illustrate example functions that support techniques for selecting a minimum measurement duration in LBT sensing slots for high band unlicensed channel access.

FIG. 4A illustrates an example function 400 that supports techniques for selecting a minimum measurement duration in LBT sensing slots for high band unlicensed channel access. The function 400 may be representative of an equation, a process, or any other means for selecting, calculating, outputting, or otherwise determining a minimum sensing duration 415-*a* or 415-*b*. Wireless devices or nodes, such as UEs 115 or BSs 105 as described with reference to FIGS. 1 and 2, may use (or otherwise employ) the function 400 to calculate, select, output, or otherwise determine a minimum sensing duration 415-*a* or 415-*b* in accordance with a sensing bandwidth 410 for contention based channel access. For example, a sensing device, such as a UE 115, may perform energy measurements during a sensing period, as described in more detail with reference to FIGS. 3A, 3B, and 3C, for at least the minimum sensing duration 415-*a* or 415-*b* as calculated, output, or otherwise determined using the function 400.

The function 400 may include a minimum sensing duration component 405 and the sensing device may use the minimum sensing duration component 405 to select or otherwise determine a minimum sensing duration according to a sensing bandwidth (such as a channel bandwidth, an active downlink BWP bandwidth, an active uplink BWP bandwidth, or any other notion of LBT bandwidth). For example, the sensing device may input, into the minimum sensing duration component 405, a sensing bandwidth 410 (such as a bandwidth over which the sensing devices measures or senses the channel) and obtain, as an output of the minimum sensing duration component 405, one or more minimum sensing durations 415-*a* or 415-*b* based thereon.

In some examples, the minimum sensing duration component 405 may output a same minimum sensing duration 415-*a* or 415-*b* for different (for example, all) channel sensing structures. For example, the sensing device may use a minimum sensing duration 415-*a* or 415-*b* output from the minimum sensing duration component 405 for observations slots, deferral slots, and contention slots. In some other examples, the minimum sensing duration component 405 may output minimum sensing durations 415-*a* or 415-*b* for specific slots. In other words, the minimum sensing duration component 405 may output a minimum sensing duration 415-*a* for a first slot and may output a minimum sensing duration 415-*b* for a second slot. For example, the minimum sensing duration component 405 may output the minimum sensing duration 415-*a* for an observation slot and the minimum sensing duration 415-*b* for a deferral slot.

In some examples, the minimum sensing duration component 405 may output different minimum sensing durations 415-*a* or 415-*b* for different sensing periods within a specific slot. For example, the minimum sensing duration 415-*a* may include a minimum duration of $z$ µs during which the sensing device measures or senses the channel within an observation slot. For further example, the minimum sensing duration 415-*b* may include a minimum duration of $x$ µs for a sensing period within a first portion of a deferral slot and a minimum duration of $z$ µs for a sensing period within a second portion of a deferral slot. Such various portions of a deferral slot featuring different length sensing periods are illustrated by and described in more detail with reference to FIG. 3B.

In some examples, the minimum sensing durations 415-*a* or 415-*b* may be inversely related (such as inversely proportional) to the sensing bandwidth 410, such that for an increasing sensing bandwidth 410, the minimum sensing durations 415-*a* or 415-*b* decreases. For example, the minimum sensing duration component 405 may include (or exhibit the functions of) a model, expression, or the like such that the minimum sensing duration component 405 may input sensing bandwidth 410 and output a minimum sensing duration 415-*a* or 415-*b* according to the inverse relationship between the sensing bandwidth 410 and the minimum sensing duration 415-*a* or 415-*b*. In some implementations, the minimum sensing duration component 405 may output minimum sensing durations 415-*a* or 415-*b* that are bounded by a minimum duration and a maximum duration (such that the outputs of the minimum sensing duration component 405 are within a lower and upper bound). In other words, for example, the minimum sensing durations 415-*a* or 415-*b* may be less than or equal to an upper bound and greater than or equal to a lower bound. The relationship between sensing bandwidths 410 and the minimum sensing durations 415-*a* or 415-*b* may be predefined at the sensing device, dynamically selected by the sensing device, signaled to the sensing device, or the like.

In addition to, or as an alternative to, using the function 400 to calculate, select, or otherwise determine the minimum sensing duration 415-*a* or 415-*b*, the sensing device may select the minimum sensing duration 415-*a* or 415-*b* from a set of discrete values, as described with reference to FIG. 4B.

In some examples, the sensing bandwidth 410 may be large enough such that the minimum sensing duration component 405 outputs a minimum sensing duration 415-*a* or 415-*b* which may enable a sensing device to perform energy sensing measurements using multiple beams during a same sensing slot (for example, an observation slot, a contention slot, a deferral slot). For example, the sensing device may communicate with another device using two beams, where the sensing device may perform energy sensing measurements using a first beam, switch to a second beam, and perform energy sensing measurements using the second beam. In such examples, the sensing bandwidth 410 may correspond to a minimum sensing duration 415-*a* or 415-*b* small enough such that the sensing device may select a sensing duration small enough to perform energy sensing measurements using the first beam and the second beam during a same sensing slot (for example, an observation slot, a contention slot, a deferral slot).

Figure 4B:
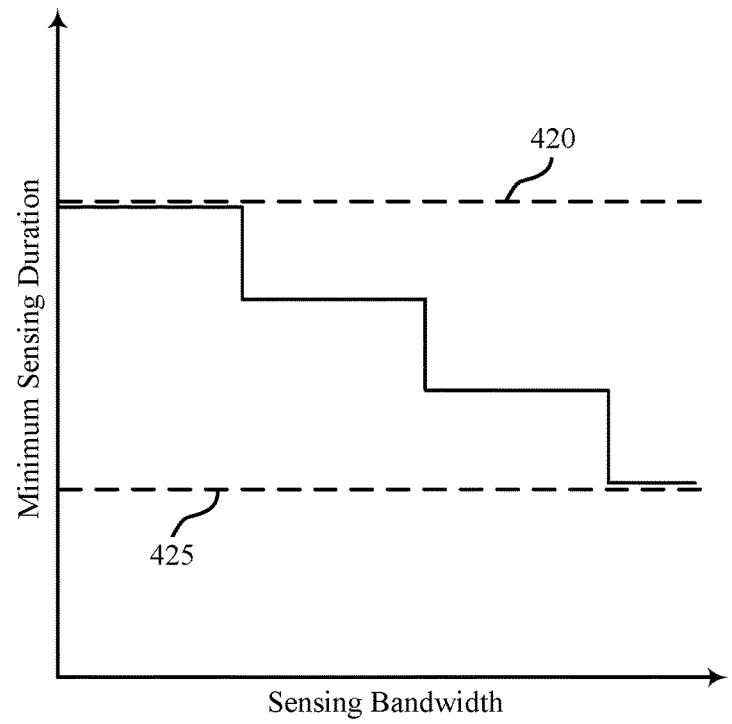

FIG. 4B illustrates an example function 401 that supports techniques for selecting a minimum measurement duration in LBT sensing slots for high band unlicensed channel access. The function 401 may be representative of a decreasing step function associated with selecting a minimum sensing duration for one or more sensing periods within an LBT procedure. Wireless devices or nodes, such as UEs 115 or BSs 105 as described with reference to FIGS. 1 and 2, may use (or otherwise employ) the function 401 to select or otherwise determine a minimum sensing duration in accordance with a sensing bandwidth for contention-based channel access. For example, a sensing device, such as a UE 115, may perform energy sensing measurements during a sensing period, as described in more detail with reference to FIGS. 3A, 3B, and 3C, for at least the minimum sensing duration selected using the function 401.

The function 401 may represent a relationship between a minimum sensing duration and a sensing bandwidth (such as a channel bandwidth, an active BWP downlink bandwidth, an active BWP uplink bandwidth, or any other notion of LBT bandwidth). For example, a sensing device (or a component therein) may input a sensing bandwidth (such as a bandwidth over which the sensing bandwidth measures or senses a channel as part of an LBT procedure) into the function 401 and may select one or more minimum sensing durations in accordance with an output of the function 401.

In some examples, the sensing device may select a same minimum sensing duration for different (for example, all)

channel sensing structures. For example, the sensing device may use a minimum sensing duration output from the function 401 for observations slots, deferral slots, and contention slots. In some other examples, the sensing device may select minimum sensing durations for specific slots. In other words, the function 401 may output a first minimum sensing duration for a first slot and may output a second minimum sensing duration for a second slot. For example, the function 401 may output the first minimum sensing duration for an observation slot and the second minimum sensing duration for a deferral slot.

In some examples, minimum sensing durations may be inversely related to the sensing bandwidth. For example, and as illustrated by FIG. 4B, the relationship between minimum sensing duration and sensing bandwidth may be represented by a decreasing step function. In other words, the sensing device may select the minimum sensing duration from a discrete set of values according to which the minimum sensing duration decreases for increasing sensing bandwidth. In some implementations, the minimum sensing duration may be bound by a maximum duration 420 and a minimum duration 425. In such implementations, the sensing device may select the minimum sensing duration such that the minimum sensing duration is less than or equal to the maximum duration 420 and greater than or equal to the minimum duration 425.

In addition to, or as an alternative to, calculating, selecting, or otherwise determining a minimum sensing duration in accordance with at sensing bandwidth, the sensing device may select the minimum sensing duration in accordance with one or more energy thresholds. Such a selection of the minimum sensing duration in accordance with an energy threshold is illustrated by and described in more detail with reference to FIGS. 5A and 5B.

Figure 5A:
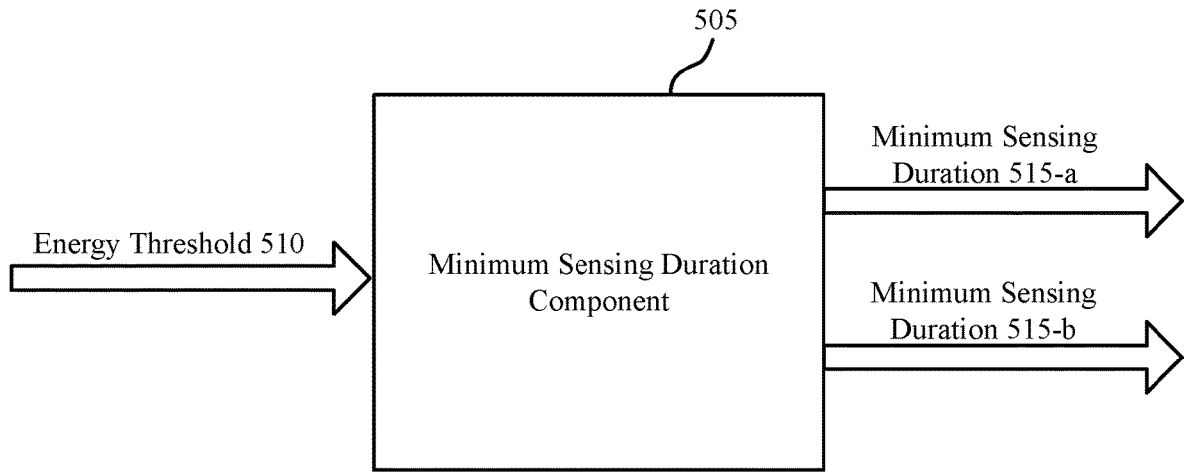
FIGS. 5A and 5B illustrate example functions that support techniques for selecting a minimum measurement duration in LBT sensing slots for high band unlicensed channel access.

FIG. 5A illustrates an example function 500 that supports techniques for selecting a minimum measurement duration in LBT sensing slots for high band unlicensed channel access. The function 500 may be representative of an equation, a process, or any other means for selecting a minimum sensing duration 515-a or 515-b for one or more sensing periods within an LBT procedure. Wireless devices or nodes, such as UEs 115 or BSs 105 as described with reference to FIGS. 1 and 2, may use (or otherwise employ) the function 500 to calculate, select, output, or otherwise determine a minimum sensing duration 515-a or 515-b in accordance with an energy threshold 510 for contention-based channel access. For example, a sensing device, such as a UE 115, may perform energy measurements during a sensing period, as described in more detail with reference to FIGS. 3A, 3B, and 3C, for at least the minimum sensing duration 515-a or 515-b as calculated, selected, output, or otherwise determined using the function 500.

The function 500 may include a minimum sensing duration component 505 which may be an example of, or may otherwise correspond to, the minimum sensing duration component 405 as described with reference to FIG. 4A. As such, the sensing device may use the minimum sensing duration component 505 to select or otherwise determine a minimum sensing duration 515-a or 515-b according to an energy threshold (such as an energy detection threshold or an energy power spectral density threshold). For example, the sensing device may input, into the minimum sensing duration component 505, an energy threshold 510 and obtain, as an output of the minimum sensing duration component 505, one or more minimum sensing durations 515-a or 515-b based thereon.

In some examples, the minimum sensing duration component 505 may output a same minimum sensing duration 515-a or 515-b for different (for example, all) channel sensing structures. For example, the sensing device may use a minimum sensing duration 515-a or 515-b output from the minimum sensing duration component 505 for observations slots, deferral slots, and contention slots. In some other examples, the minimum sensing duration component 505 may output minimum sensing durations 515-a or 515-b for specific slots. In other words, the minimum sensing duration component 505 may output a minimum sensing duration 515-a for a first slot and a minimum sensing duration 515-b for a second slot. For example, the minimum sensing duration component 505 may output the minimum sensing duration 515-a for an observation slot and the minimum sensing duration 515-b for a deferral slot.

In some examples, the minimum sensing duration component 505 may output different minimum sensing durations 515-a or 515-b for different sensing periods within a specific slot. For example, the minimum sensing duration 515-a may include a minimum duration of z µs during which the sensing device measures or senses the channel within an observation slot. For further example, the minimum sensing duration 515-b may include a minimum duration of x µs for a sensing period within a first portion of a deferral slot and a minimum duration of z µs for a sensing period within a second portion of a deferral slot. Such various portions of a deferral slot featuring different length sensing periods are illustrated by and described in more detail with reference to FIG. 3B.

In some examples, the minimum sensing durations 515-a or 515-b may be inversely related (such as inversely proportional) to the energy threshold 510, such that for an increasing energy threshold 510, the minimum sensing durations 515-a or 515-b decreases. For example, the minimum sensing duration component 505 may include (or exhibit the functions of) a model, expression, or the like such that the minimum sensing duration component 505 may input energy threshold 510 and output a minimum sensing duration 515-a or 515-b according to the inverse relationship between the energy threshold 510 and the minimum sensing duration 515-a or 515-b. In some implementations, the minimum sensing duration component 505 may output minimum sensing durations 515-a or 515-b that are bounded by a minimum duration and a maximum duration (such that the outputs of the minimum sensing duration component 505 are within a lower and upper bound). In other words, the minimum sensing durations 515-a or 515-b may be less than or equal to an upper bound and greater than or equal to a lower bound. The relationship between energy thresholds 510 and the minimum sensing durations 515-a or 515-b may be predefined at the sensing device, dynamically selected by the sensing device, signaled to the sensing device, or the like.

In addition to, or as an alternative to, using the function to calculate, select, or otherwise determine the minimum sensing duration 515-a or 515-b, the sensing device may select the minimum sensing duration 515-a or 515-b from a set of discrete values, as described with reference to FIG. 5B.

Figure 5B:
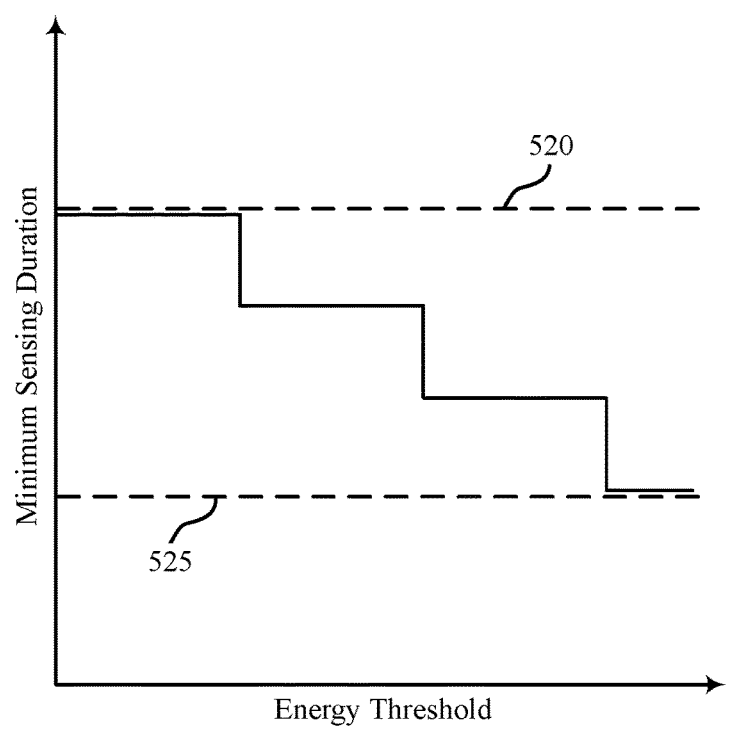

FIG. 5B illustrates an example function 501 that supports techniques for selecting a minimum measurement duration in LBT sensing slots for high band unlicensed channel access. The function 501 may be representative of a decreasing step function associated with selecting a minimum sensing duration for one or more sensing periods within an LBT procedure. Wireless devices or nodes, such as UEs 115 or BSs 105 as described with reference to FIGS. 1 and 2, may use (or otherwise employ) the function 501 to select or otherwise determine a minimum sensing duration in accordance with an energy threshold for contention-based channel access. For example, a sensing device, such as a UE 115, may perform energy measurements during a sensing period, as described in more detail with reference to FIGS. 3A, 3B, and 3C, for at least the minimum sensing duration selected using the function 501.

The function 501 may represent a relationship between a minimum sensing duration and an energy threshold (such as an energy detection threshold or an energy power spectral density threshold). For example, a sensing device (or a component therein) may input an energy threshold into the function 501 and may select one or more minimum sensing durations in accordance with an output of the function 501.

In some examples, the sensing device may select a same minimum sensing duration for different (for example, all) channel sensing structures. For example, the sensing device may use a minimum sensing duration output from the function 501 for observations slots, deferral slots, and contention slots. In some other examples, the sensing device may select minimum sensing durations for specific slots. In other words, the function 501 may output a first minimum sensing duration for a first slot and may output a second minimum sensing duration for a second slot. For example, the function 501 may output the first minimum sensing duration for an observation slot and the second minimum sensing duration for a deferral slot.

In some examples, minimum sensing durations may be inversely related to the energy threshold. For example, and as illustrated by FIG. 5B, the relationship between minimum sensing duration and energy threshold may be represented by a decreasing step function. In other words, the sensing device may select the minimum sensing duration from a discrete set of values according to which the minimum sensing duration decreases for an increasing energy threshold. In some implementations, the minimum sensing duration may be bound by a maximum duration 520 and a minimum duration 525. In such implementations, the sensing device may select the minimum sensing duration such that the minimum sensing duration is less than or equal to the maximum duration 520 and greater than or equal to the minimum duration 525.

Figure 6:
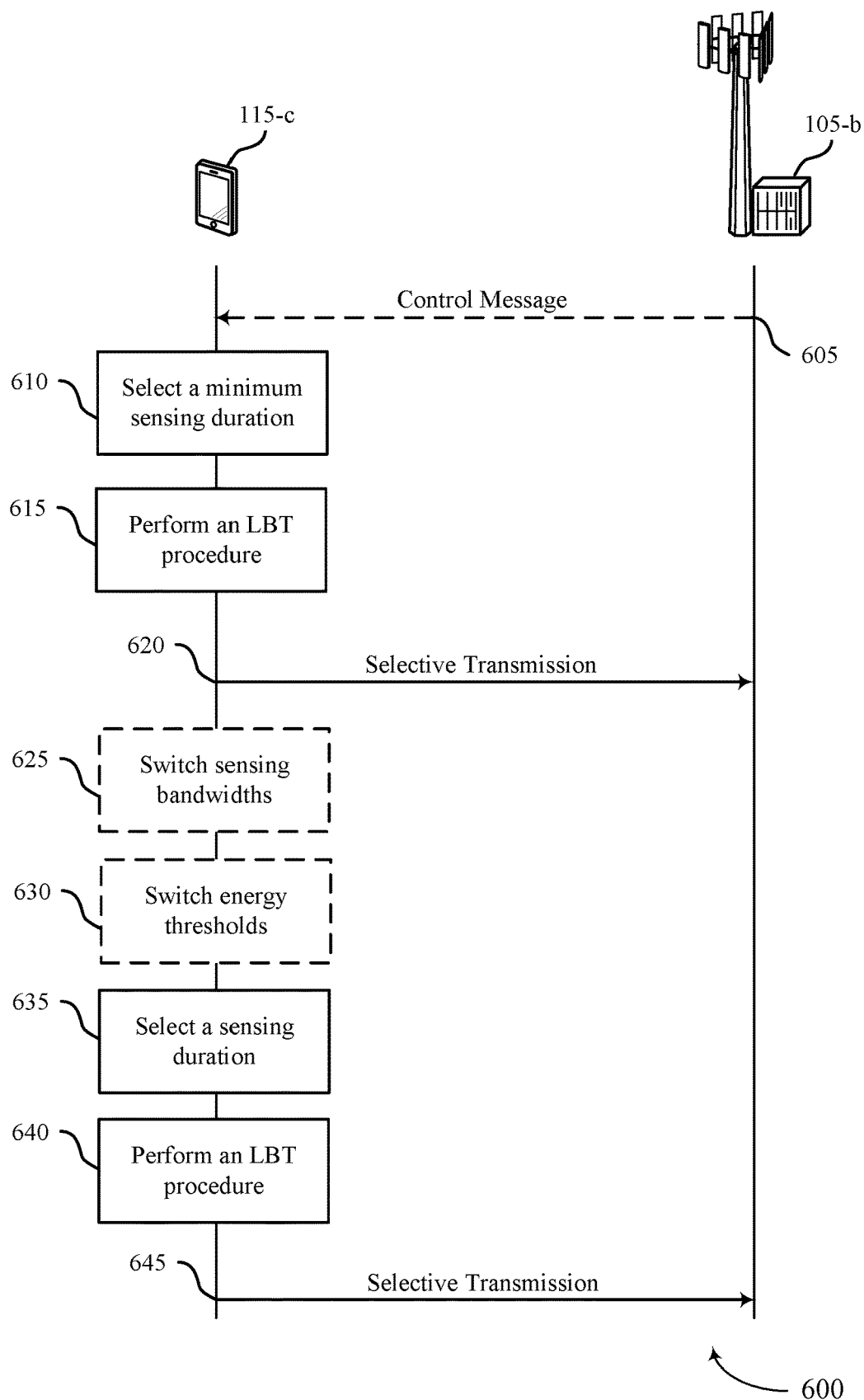
FIG. 6 illustrates an example process flow that supports techniques for selecting a minimum measurement duration in LBT sensing slots for high band unlicensed channel access.

FIG. 6 illustrates an example process flow 600 that supports techniques for selecting a minimum measurement duration in LBT sensing slots for high band unlicensed channel access. In some implementations, the process flow 600 may implement aspects of the wireless communications system 100 or the signaling diagram 200. For example, the process flow 600 illustrates communication between a UE 115-*c* and one or more components of a BS 105-*b* (which may be examples of the corresponding devices described herein, including with reference to FIGS. 1 and 2) and, in some implementations, the UE 115-*c* and the BS 105-*b* may communicate over an unlicensed or shared channel or frequency range. In some examples, the UE 115-*c* may function as a sensing device and may perform a channel access procedure in accordance with a minimum sensing duration.

In the following description of the process flow 600, the operations may be performed (for example, reported or provided) in a different order than the order shown, or the operations performed by the UE 115-*c* and the BS 105-*b* may be performed in different orders or at different times. For example, specific operations also may be left out of the process flow 600, or other operations may be added to the process flow 600. Further, although some operations or signaling may be shown to occur at different times for discussion purposes, these operations may actually occur at the same time.

At 605, one or more components of the BS 105-*b* may, in some implementations, transmit a control message to the UE 115-*c*, the control message configuring the UE 115-*c* to select a minimum sensing duration for channel sensing as part of a channel access procedure (such as an LBT procedure). For example, the one or more components of the BS 105-*b* may transmit the control message indicating that the UE 115-*c* is to select the minimum sensing duration in accordance with a sensing bandwidth or an energy threshold (such as an energy detection threshold or an energy power spectral density threshold), or both. Alternatively, the UE 115-*c* may select a minimum sensing duration in accordance with a sensing bandwidth or an energy threshold, or both, according to a standard or default configuration (such as a configuration in a specification).

At 610, the UE 115-*c* may select the minimum sensing duration for an LBT procedure according to at least one of the sensing bandwidth or the energy threshold (as indicated or configured by the BS 105-*b* via the control message or by the standard or default configuration). In some implementations, the UE 115-*c* may select the minimum sensing duration in response to receiving the control message at 605. In some implementations, the UE 115-*c* may select the minimum sensing duration by calculating the minimum sensing duration using a function featuring an inverse relationship between the minimum sensing duration and at least one or the sensing bandwidth or the energy threshold. In some examples, the function featuring the inverse relationship may be associated with (have) an upper limit and a lower limit such that possible or available minimum sensing duration values are between the upper limit and the lower limit. In some other examples, the UE 115-*c* may select the minimum sensing duration from a set of minimum sensing durations according to at least one of the sensing bandwidth or the energy threshold. In such examples, the set of minimum sensing durations may include a set of values, each value of the set of values corresponding to at least one of a range of sensing bandwidths or a range of energy thresholds.

In some implementations, the UE 115-*c* may select minimum sensing durations for different sensing periods, different slots, or different portions of a same slot. For example, the UE 115-*c* may select a first value for the minimum sensing duration of a sensing period within an observation slot, a contention slot, or any other slot associated with the LBT procedure. Additionally, or alternatively, the UE 115-*c* may select a second value for the minimum sensing duration of a sensing period within a deferral slot associated with the LBT procedure. In some implementations, the minimum sensing duration may include, be understood as, or indicate a quantity of z μs as the minimum sensing duration within an observation slot or a contention slot and a quantity of x μs and z μs as the minimum sensing duration within a deferral slot (for deferral slots that include two separate sensing periods, one spanning at least x μs and the other spanning at least z μs). Additional details relating to such sensing periods spanning at least x μs or z μs are described herein, including with reference to FIGS. 3A, 3B, and 3C.

In some implementations, the sensing bandwidth may be relatively large such that that the minimum sensing duration may be sufficiently small to enable a sensing device to perform energy sensing measurements using multiple beams during a same sensing slot (for example, an observation slot, a contention slot, a deferral slot). For example, the sensing device may communicate with another device using two beams, where the sensing device may perform energy sensing measurements using a first beam, switch to a second beam, and perform energy sensing measurements using the second beam. In such examples, the sensing bandwidth may correspond to a minimum sensing duration small enough such that the sensing device may select a sensing duration small enough to perform energy sensing measurements using the first beam and the second beam during a same sensing slot (for example, an observation slot, a contention slot, a deferral slot).

At 615, the UE 115-c may perform the LBT procedure for a wireless channel (such as a shared channel over which the UE 115-c and the one or more components of the BS 105-b communicate). In some examples, performing the LBT procedure may include measuring or sensing the wireless channel for at least the minimum sensing duration (during each observation slot and each deferral slot).

At 620, the UE 115-c may selectively transmit on the wireless channel in accordance with the LBT procedure. For example, if the UE 115-c senses that the channel is free as a result of performing the LBT procedure (such that a measured energy satisfies an energy detection threshold), the UE 115-c may transmit to the BS 105-b over the channel. Alternatively, if the UE 115-c senses that the channel is occupied as a result of performing the LBT procedure (such that a measured energy fails to satisfy an energy detection threshold), the UE 115-c may refrain from transmitting to the BS 105-b over the channel.

At 625, the UE 115-c may, in some implementations, switch sensing bandwidths. For example, the UE 115-c may switch from the sensing bandwidth to a second sensing bandwidth. In some implementations, the UE 115-c may switch sensing bandwidths in response to signaling from one or more components of the BS 105-b (such as signaling configuring the UE 115-c with another bandwidth or active BWP), one or more UE 115-c measurements (such as channel condition measurements or energy sensing measurements), or any other trigger according to which the UE 115-c may switch to a different sensing bandwidth.

At 630, in addition or as an alternative to switching sensing bandwidths, the UE 115-c may, in some implementations, switch energy thresholds. For example, the UE 115-c may switch from the energy threshold to a second energy threshold. In some implementations, the UE 115-c may switch energy thresholds in response to signaling from one or more components of the BS 105-b (such as signaling configuring the UE 115-b with another energy threshold), one or more UE 115-c measurements (such as channel condition measurements or energy sensing measurements), or any other trigger according to which the UE 115-c may switch to a different energy threshold.

At 635, the UE 115-c may select a second minimum sensing duration for the LBT procedure. In some implementations, for example, the UE 115-c may select the second minimum sensing duration for the LBT procedure according to the second sensing bandwidth (and as a result of switching to the second sensing bandwidth). Additionally, or alternatively, the UE 115-c may select the second minimum sensing duration for the LBT procedure according to the second energy threshold (and as a result of switching to the second energy threshold).

At 640, the UE 115-c may perform an LBT procedure (a second LBT procedure) for the wireless channel. In some implementations, the UE 115-c may perform the LBT procedure (the second LBT procedure) in accordance with the second minimum sensing duration.

At 645, the UE 115-c may selectively transmit on the wireless channel according to a result of the LBT procedure (the second LBT procedure). For example, if the UE 115-c senses that the channel is free as a result of performing the LBT procedure (such that a measured energy satisfies an energy detection threshold), the UE 115-c may transmit to the one or more components of the BS 105-b over the channel. Alternatively, if the UE 115-c senses that the channel is occupied as a result of performing the LBT procedure (such that a measured energy fails to satisfy an energy detection threshold), the UE 115-c may refrain from transmitting to the one or more components of BS 105-b over the channel.

Figure 7A:
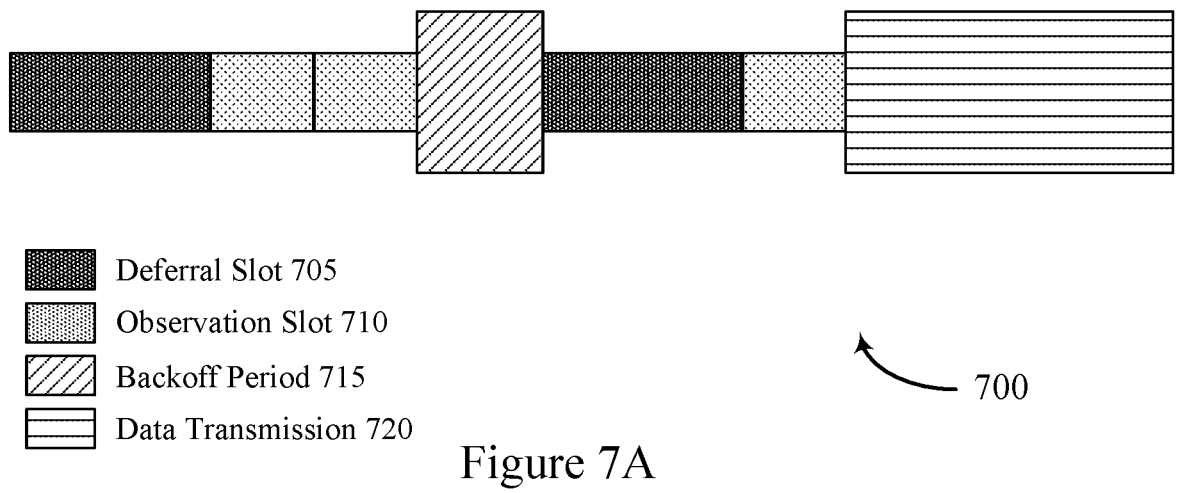
FIG. 7A illustrates an example category (CAT) 4 LBT that supports techniques for selecting a minimum measurement duration in LBT sensing slots for high band unlicensed channel access.

FIG. 7A illustrates an example CAT 4 LBT procedure 700 that supports techniques for selecting a minimum measurement duration in LBT sensing slots for high band unlicensed channel access. In some examples, a sensing device, such as a UE 115 or a BS 105 as described with reference to FIGS. 1, 2, and 6, may attempt to acquire a channel by performing the CAT 4 LBT procedure 700. Further, although described with reference to FIG. 7A in terms of the CAT 4 LBT procedure 700, the sensing device implement the techniques described herein to select, define, or set a minimum sensing duration for any category LBT procedure.

For example, the sensing device may perform the CAT 4 LBT procedure 700, according to which the sensing device may perform energy sensing measurements during one or more slots (such as deferral slots 705 and observation slots 710). As part of the CAT 4 LBT procedure 700, the sensing device may measure or sense the channel over a sequence of deferral slots 705, observation slots 710, and backoff periods 715 in accordance with rules (or guidelines) specific to the CAT 4 LBT procedure 700.

By way of example, and as part of the CAT 4 LBT procedure 700, the sensing device may measure or sense the channel during a deferral slot 705, which may include measuring or sensing the channel during one or more sensing periods (and each of the one or more sensing periods may span a time period of at least a minimum sensing duration, as described in more detail with reference to FIGS. 1-6). The sensing device also may measure or sense the channel during a quantity of observation slots 710 prior to transmitting the data transmission 720 on the channel. For example, as shown in FIG. 7A, the sensing device may measure or sense the channel during three observation slots 710 prior to transmitting the data transmission 720 on the channel. In the example of the CAT 4 LBT procedure 700, the sensing device may measure the channel during a sensing period (each of which may span a time period of at least a minimum sensing duration, as described in more detail with reference to FIGS. 1-6) within each observation slot 710 and may schedule consecutive observation slots 710 unless the sensing device measures an energy greater than or equal to an energy detection threshold, which may result in the sensing device scheduling a backoff period 715.

For example, if the sensing device measures or senses that the channel is busy (such as is occupied by another device), the sensing device may refrain from scheduling another consecutive observation slot 710 and may instead schedule a backoff period 715. As such, in some examples, the sensing device may refrain from measuring or sensing the channel, refrain from transmitting on the channel, or any combination thereof for a duration of the backoff period 715. Upon expiration of the backoff period 715, the sensing device may continue measuring or sensing the channel. In some implementations, for example, the sensing device may continue measuring or sensing the channel during another deferral slot 705.

In some examples, the sensing device may measure or sense that the channel is free as a result of the measurements obtained during the deferral slot 705 and may continue to measure or sense the shared channel during one or more additional observation slots 710. If the sensing device is configured to sense the channel for three observation slots 710 prior to transmitting the data transmission 720, as shown in FIG. 7A, and if the sensing device measures or senses that the channel is free during the third observation slot 710, the sensing device may transmit the data transmission 720 on the channel.

The sensing device may use alternative LBT procedures in accordance with the minimum sensing duration as described herein. For example, the sensing device may be configured to use a CAT 4 LBT procedure with a contention window (such as Type 1). In such examples in which the sensing device performs a Type 1 CAT 4 LBT procedure, the sensing device may measure or sense the channel for an initial deferral period and such an initial deferral period may be defined according to 16 μs+p·9 μs, where p may be a parameter predefined at the sensing device, signaled by another device, or the like. Following the initial deferral period, the sensing device may sense the channel for a quantity of "count-down" slots (such as N·9 μs observation slots) and the sensing device may count down the number of "count-down" slots. Within each 9 μs "count-down" slots, the sensing device may perform an at least 4 μs measurement anywhere within that 9 μs "count-down" slot. In some examples, the sensing device may pause or freeze the count down if the sensing device measures or senses that an observation slot (such as one of the 9 μs "count-down" slots) fails energy detection (if the sensing device measures that the channel is occupied by another device). In some examples, the sensing device may resume or restart the count down if the interference or occupation of the channel is gone. For example, the sensing device may resume or restart the count down as a result of sensing the channel during another initial deferral period.

Figure 7B:
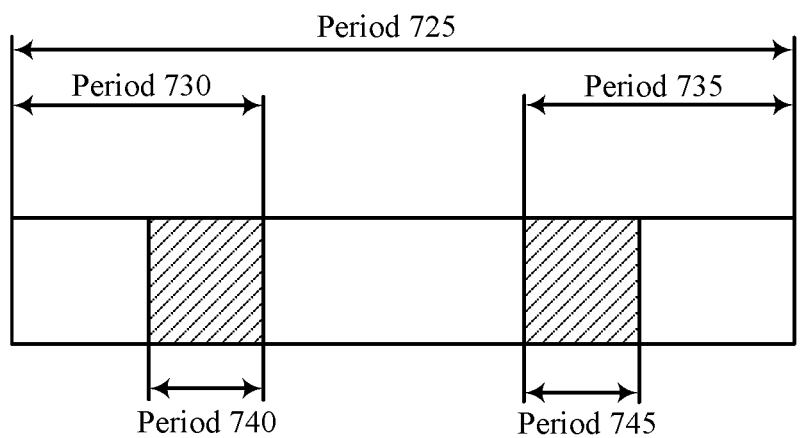
FIGS. 7B and 7C illustrate example sensing structures that support techniques for selecting a minimum measurement duration in LBT sensing slots for high band unlicensed channel access.
Figure 7C:
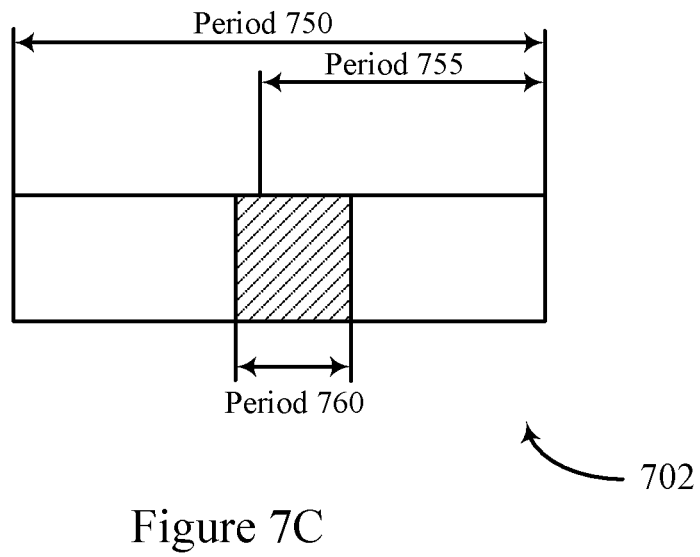

FIGS. 7B and 7C illustrate example sensing structures 701 and 702, respectively, that support techniques for selecting a minimum measurement duration in LBT sensing slots for high band unlicensed channel access. Wireless devices or nodes, such as UEs 115 and components of BSs 105 as described with reference to FIGS. 1, 2, and 6, may perform LBT procedures according to the sensing structures 701 and 702.

The sensing structure 701 illustrates a configuration according to which a sensing device to measure or sense a channel as part of an LBT procedure (such as a 25 μs CAT 2 LBT procedure). In some examples, such as in examples in which the sensing structure 701 is part of a Type 2A CAT 2 LBT procedure, the sensing structure 701 may include a gap spanning a time period 725. The time period 725 may be a predefined value (such as 25 μs), a dynamic value (such as a value selected by the sensing device), or any other period associated with observation slots. The sensing structure 701 may include two portions including a first portion spanning a time period 730 and a second portion spanning a time period 735. The time period 730 may be a predefined value (such as 9 μs) or a dynamic value (such as a value selected by a sensing device). Additionally, or alternatively, the time period 735 may be a predefined value (such as 9 μs) or a dynamic value (such as a value selected by the sensing device). In some examples, the sensing structure 701 may be an example of or include a deferral slot featuring a 9+7+9 structure with a 4 μs measurement in each 9 μs portion. The location of the 4 μs measurement in each 9 μs portion may be anywhere within that 9 μs portion and, in some examples, the sensing device may select a location for the 4 μs measurement in accordance with a device-level decision or implementation choice.

The sensing structure 701 may further include one or more sensing periods and the sensing device may measure or sense the channel during some (or all) of the sensing periods within the sensing structure 701. Sensing periods may be located at any time within the first portion of the sensing structure 701, the second portion of the sensing structure 701, or both. In the example of the sensing structure 701, the first portion may include a sensing period spanning a time period 740 and the second portion may include a sensing period spanning a time period 745. In some implementations, the time period 740 and the time period 745 may be greater than or equal to a minimum sensing duration that varies in accordance with a sensing bandwidth or an energy threshold, or both.

The sensing structure 702 illustrates a configuration according to which a sensing device may measure or sense a channel as part of an LBT procedure (such as a 16 μs CAT 2 LBT procedure). In some examples, such as in examples in which the sensing structure 702 is part of a Type 2B CAT 2 LBT procedure, the sensing structure 702 may include a gap spanning a time period 750. The time period 750 may be a predefined value (such as 16 μs) or a dynamic value (such as a value selected by the sensing device). The sensing structure 702 may include a portion spanning a time period 755. In some examples, the time period 755 may be a predefined value (such as 9 μs) or a dynamic value (such as a value selected by the sensing device). In some examples, the sensing structure 702 may be an example of or include a deferral slot featuring a 7+9 structure with at least a 5 μs measurement with at least 4 μs within the 9 μs portion of the sensing structure 702.

For example, the sensing structure 702 may include one or more sensing periods and the sensing device may measure or sense the channel during some (or all) of the one or more sensing periods. In the example of the sensing structure 702, the sensing structure 702 may include a sensing period spanning a time period 760. The time period 760 may be at least 5 μs and, in some examples, at least 4 μs of the sensing period may be located within the time period 755. In some implementations, the time period 760 may be greater than or equal to a minimum sensing duration that varies in accordance with a sensing bandwidth or an energy threshold, or both.

Although described in terms of a CAT 2 LBT procedure, the sensing device performing a contention-based channel access procedure (such as an LBT procedure) may measure or sense a channel for at least the minimum sensing duration during a slot associated with any type of random access procedure (such as a CAT 1 LBT procedure). In examples in which the sensing device performs a CAT 1 LBT procedure, the sensing device may obtain channel energy measurements over any combination of observation slots, contention slots, deferral slots, or the like, such that there is no longer than a 16 μs gap without channel sensing. Such a CAT 1 LBT procedure according to which the sensing device may measure or sense the channel at least once within a given 16 μs duration may be referred to as a Type 2C LBT procedure. In such examples in which the sensing device performs a CAT 1 LBT procedure, the sensing device may apply a transmission burst length limit for transmissions from the sensing device. For example, the sensing device may apply a transmission burst length limit of 0.584 milliseconds (ms).

As described herein, a channel access procure (such as an LBT procedure) may include or refer to a procedure depending on channel sensing that evaluates an availability of the channel for performing transmissions. In some slot-based channel access procedures, a basic unit for sensing may include a sensing slot with a duration of $T_{si}$=9 μs. The sensing duration $T_{si}$ may be considered to be idle if a UE 115 or one or more components of a BS 105 senses the channel during the sensing duration and measures (or otherwise determines) that the measured or detected power for at least 4 μs within the sensing slot duration is less than an energy detection threshold $X_{Thresh}$. Otherwise, the sensing slot duration $T_{si}$ is considered to be busy.

Further, although a UE 115 described as being the sensing device performing the channel access procedure with reference to some Figures (such as FIGS. 2 and 6), one or more components of a BS 105 may additionally, or alternatively, be a sensing device and perform a channel access procedure prior to transmitting to a UE 115 via a downlink. For example, in a Type 2A downlink channel access procedure, the one or more components of the BS 105 (which may be an example of an eNB or a gNB) may transmit a downlink transmission as a result of sensing the channel to be idle for at least a sensing interval $T_{short\ di}$=25 sμ. In some examples, $T_{short\ di}$ may include a duration of $T_f$=16 s followed by (such as immediately followed by) one sensing slot and $T_f$ may include a sensing slot at the start of $T_f$. In some examples, the channel may be considered to be idle for $T_{short\ di}$ if both sensing slots of $T_{short\ di}$ are sensed to be idle. Alternatively, in Type 2B downlink channel access procedure, the BS 105 may transmit a downlink transmission immediately after sensing the channel to be idle within a duration of $T_f$=16 μs. $T_f$ may include a sensing slot that occurs within the last 9 μs of $T_f$ and the channel may be considered to be idle within the duration $T_f$ if the channel is sensed to be idle for a total of least 5 μs with at least 4 μs of sensing occurring in the sensing slot.

In some examples, the sensing device may perform the sensing operation on more than one beams such that a first beam is used for one sensing measurement and a second beam is used for another sensing measurement within a same slot (for example, within a same observation slot). In some cases, the duration for performing the sensing measurement using the first beam may be the same or different than the duration for performing the sensing measurement using the second beam.

Figure 8:
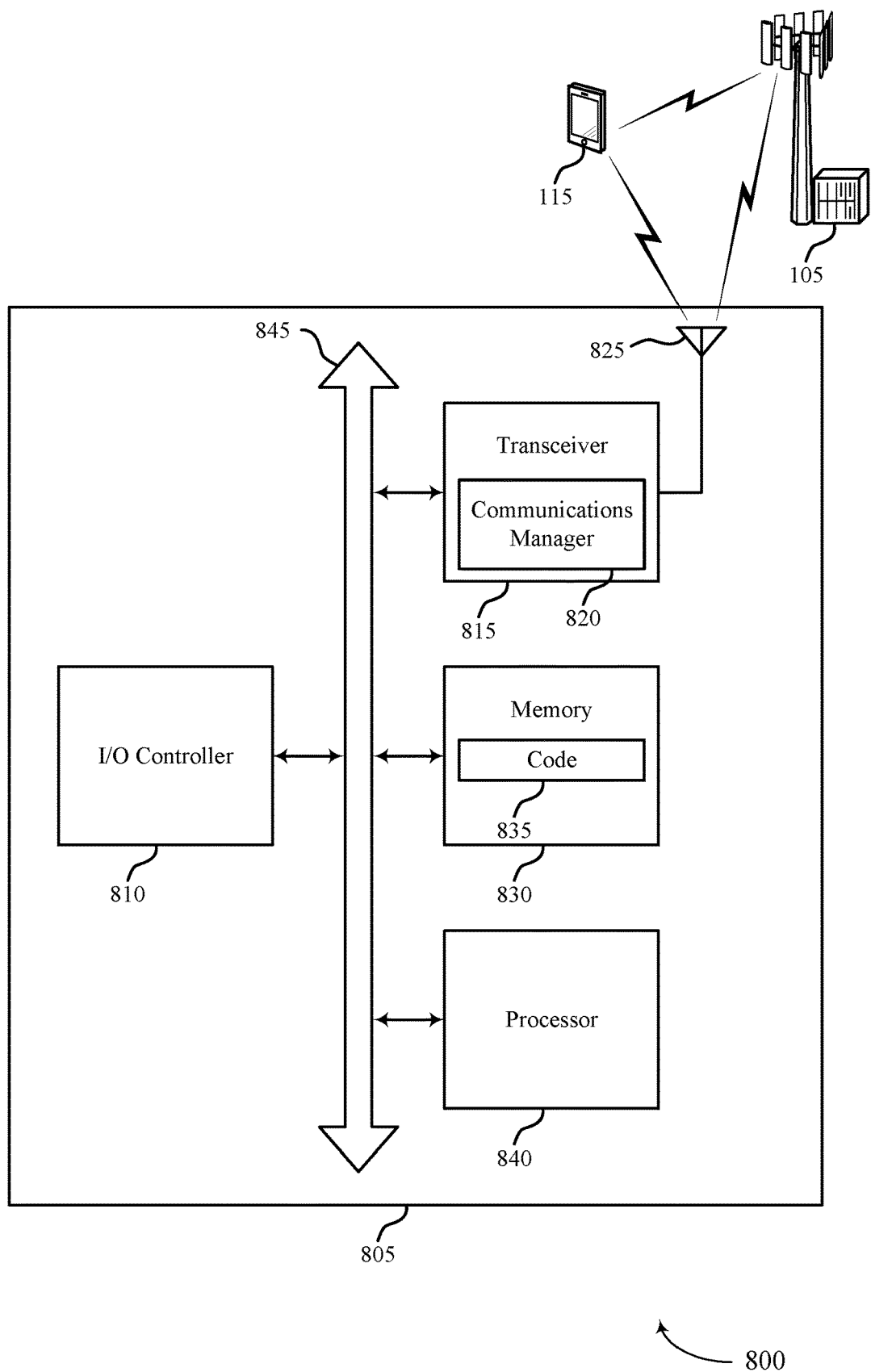
FIG. 8 shows a block diagram of an example device that supports techniques for selecting a minimum measurement duration in LBT sensing slots for high band unlicensed channel access.

FIG. 8 shows a block diagram 800 of an example device 805 that supports techniques for selecting a minimum measurement duration in LBT sensing slots for high band unlicensed channel access. The device 805 may communicate wirelessly with one or more BSs 105, UEs 115, any other device, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (such as operatively, communicatively, functionally, electronically, electrically) via one or more buses (such as a bus 845).

The I/O controller 810 may manage input and output signals for the device 805. The I/O controller 810 also may manage peripherals not integrated into the device 805. In some implementations, the I/O controller 810 may represent a physical connection or port to an external peripheral. In some implementations, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some implementations, the I/O controller 810 may be implemented as part of a processor or processing system, such as the processor 840. In some implementations, a user may interact with the device 805 via the I/O controller 810 or via hardware components controlled by the I/O controller 810.

In some implementations, the device 805 may include a single antenna 825. However, in some other implementations, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 also may include a modem to modulate the packets, to provide the modulated packets to one or more antennas 825 for transmission, and to demodulate packets received from the one or more antennas 825. In some implementations, the transceiver 815 may include one or more interfaces, such as one or more interfaces coupled with the one or more antennas 825 that are configured to support various receiving or obtaining operations, or one or more interfaces coupled with the one or more antennas 825 that are configured to support various transmitting or outputting operations, or a combination thereof. In some implementations, the transceiver 815 may include or be configured for coupling with one or more processors or memory components that are operable to perform or support operations based on received or obtained information or signals, or to generate information or other signals for transmission or other outputting, or any combination thereof. In some implementations, the transceiver 815, or the transceiver 815 and the one or more antennas 825, or the transceiver 815 and the one or more antennas 825 and one or more processors or memory components (for example, the processor 840, or the memory 830, or both), may be included in a chip or chip assembly that is installed in the device 805.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some implementations, the code 835 may not be directly executable by the processor 840 but may cause a computer (for example, when compiled and executed) to perform functions described herein. In some implementations, the memory 830 may contain, among other things, a basic I/O system (BIOS) which may control basic hardware or software operation such as the interaction with peripheral components or devices.

The processor 840 may be any one or more suitable processors capable of executing scripts or instructions of one or more software programs stored in the device 805 (such as within the memory 830). In some implementations, the processor 840 may be a component of a processing system. A processing system may generally refer to a system or series of machines or components that receives inputs and processes the inputs to produce a set of outputs (which may be passed to other systems or components of, for example, the device 805). For example, a processing system of the device 805 may refer to a system including the various other components or subcomponents of the device 805, such as the processor 840, or the transceiver 815, or the communications manager 820, or other components or combinations of components of the device 805. The processing system of the device 805 may interface with other components of the device 805, and may process information received from other components (such as inputs or signals) or output information to other components. For example, a chip or modem of the device 805 may include a processing system, a first interface to output information, and a second interface to obtain information. In some implementations, the first interface may refer to an interface between the processing system of the chip or modem and a transmitter, such that the device 805 may transmit information output from the chip or modem. In some implementations, the second interface may refer to an interface between the processing system of the chip or modem and a receiver, such that the device 805 may obtain information or signal inputs, and the information may be passed to the processing system. A person having ordinary skill in the art will readily recognize that the first interface also may obtain information or signal inputs, and the second interface also may output information or signal outputs.

The communications manager 820 may support wireless communication at a node in accordance with examples as disclosed herein. For example, the communications manager 820 may be configured as or otherwise support a means for selecting a minimum sensing duration for an LBT procedure according to at least one of a sensing bandwidth associated with the LBT procedure or an energy threshold associated with the LBT procedure. The communications manager 820 may be configured as or otherwise support a means for performing the LBT procedure for a wireless channel, where performing the LBT procedure includes monitoring the wireless channel for at least the selected minimum sensing duration. The communications manager 820 may be configured as or otherwise support a means for selectively transmitting on the wireless channel according to a result of the LBT procedure.

In some implementations, the communications manager 820 may be configured to perform various operations (for example, receiving, monitoring, transmitting) using or otherwise in cooperation with the transceiver 815, the one or more antennas 825, or any combination thereof. Although the communications manager 820 is illustrated as a separate component, in some implementations, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for selecting a minimum measurement duration in LBT sensing slots for high band unlicensed channel access as described herein, or the processor 840 and the memory 830 may be otherwise configured to perform or support such operations.

In some examples, to support selecting the minimum sensing duration, the communications manager 820 may be configured as or otherwise support a means for calculating the minimum sensing duration using a function featuring an inverse relationship between the minimum sensing duration and at least one of the sensing bandwidth or the energy threshold. In some examples, the function is associated with an upper limit and a lower limit, and possible values for the minimum sensing duration are between the upper limit and the lower limit.

In some examples, to support selecting the minimum sensing duration, the communications manager 820 may be configured as or otherwise support a means for selecting the minimum sensing duration from a set of possible minimum sensing durations according to at least one of the sensing bandwidth or the energy threshold. In some examples, the set of possible minimum sensing durations includes a set of decreasing values, each value of the set of decreasing values corresponding to at least one of a range of sensing bandwidths or a range of energy thresholds.

In some examples, to support selecting the minimum sensing duration, the communications manager 820 may be configured as or otherwise support a means for selecting a first value for a minimum length of a sensing period within a sensing slot associated with the LBT procedure. In some examples, to support selecting the minimum sensing duration, the communications manager 820 may be configured as or otherwise support a means for selecting a second value for a minimum length of one or more sensing periods within a deferral slot associated with the LBT procedure.

In some examples, the communications manager 820 may be configured as or otherwise support a means for switching from the sensing bandwidth to a second sensing bandwidth. In some examples, the communications manager 820 may be configured as or otherwise support a means for selecting a second minimum sensing duration for the LBT procedure according to the second sensing bandwidth. In some examples, the communications manager 820 may be configured as or otherwise support a means for performing the LBT procedure for the wireless channel, where performing the LBT procedure includes monitoring the wireless channel for at least the selected second minimum sensing duration.

In some examples, the communications manager 820 may be configured as or otherwise support a means for switching from the energy threshold to a second energy threshold. In some examples, the communications manager 820 may be configured as or otherwise support a means for selecting a second minimum sensing duration for the LBT procedure according to the second energy threshold. In some examples, the communications manager 820 may be configured as or otherwise support a means for performing the LBT procedure for the wireless channel, where performing the LBT procedure includes monitoring the wireless channel for at least the selected second minimum sensing duration.

In some examples, the sensing bandwidth is a channel bandwidth or an active BWP bandwidth. In some examples, the energy threshold is an energy detection threshold or an energy power spectral density threshold.

Figure 9:
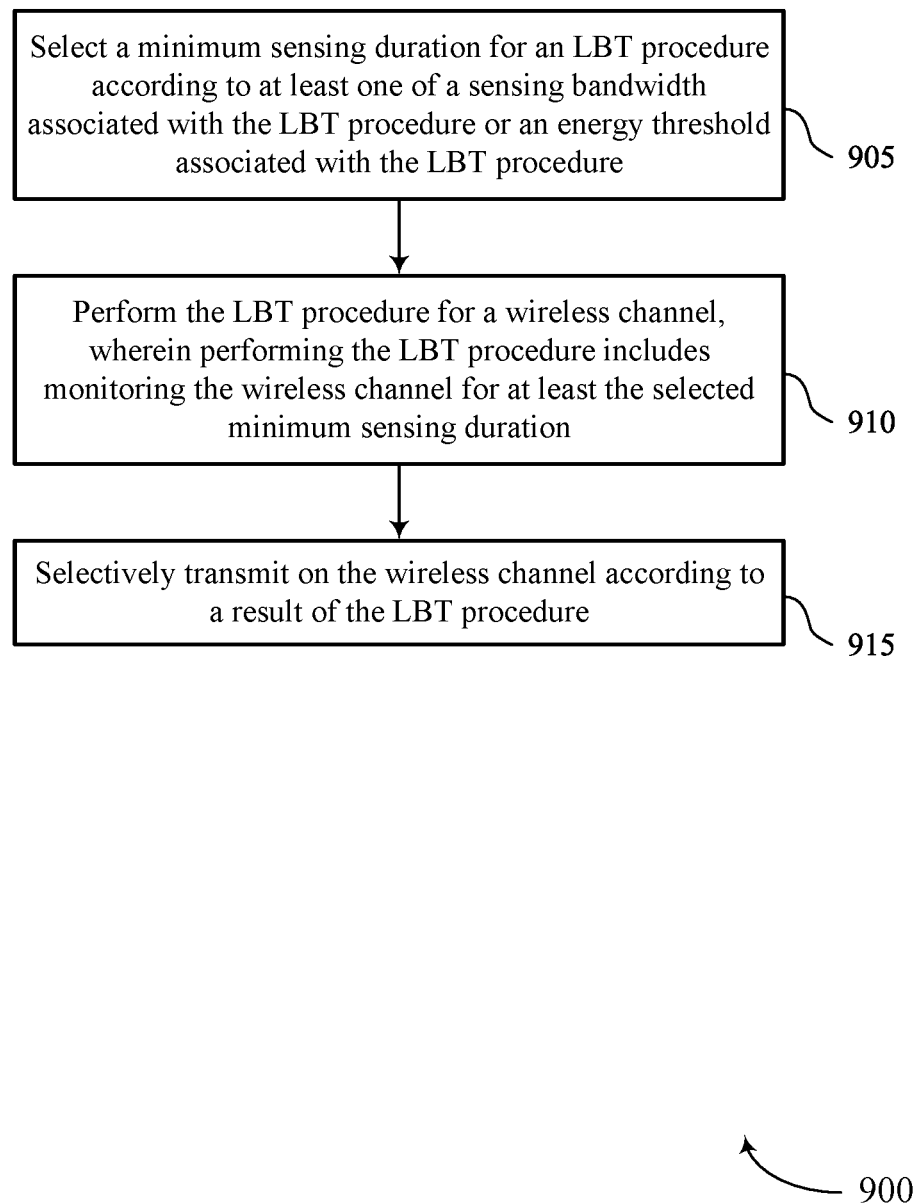
FIG. 9 shows a flowchart illustrating example methods that support techniques for selecting a minimum measurement duration in LBT sensing slots for high band unlicensed channel access.

FIG. 9 shows a flowchart illustrating an example method 900 that supports techniques for selecting a minimum measurement duration in LBT sensing slots for high band unlicensed channel access. The operations of the method 900 may be implemented by a UE or its components as described herein. For example, the operations of the method 900 may be performed by a UE 115 as described with reference to FIGS. 1-8. In some examples, a UE may execute a set of instructions to control the functional elements of the UE to perform the described functions. Additionally, or alternatively, the UE may perform aspects of the described functions using special-purpose hardware.

At block 905, the method may include selecting a minimum sensing duration for an LBT procedure according to at least one of a sensing bandwidth associated with the LBT procedure or an energy threshold associated with the LBT procedure. The operations of block 905 may be performed in accordance with examples as disclosed herein.

At block 910, the method may include performing the LBT procedure for a wireless channel, where performing the LBT procedure includes monitoring the wireless channel for at least the selected minimum sensing duration. The operations of block 910 may be performed in accordance with examples as disclosed herein.

At block 915, the method may include selectively transmitting on the wireless channel according to a result of the LBT procedure. The operations of block 915 may be performed in accordance with examples as disclosed herein.

The following provides an overview of some aspects of the present disclosure:

Aspect 1: A method for wireless communication at a node, including: selecting a minimum sensing duration for an LBT procedure according to at least one of a sensing bandwidth associated with the LBT procedure or an energy threshold associated with the LBT procedure; performing the LBT procedure for a wireless channel, where performing the LBT procedure includes monitoring the wireless channel for at least the selected minimum sensing duration; and selectively transmitting on the wireless channel according to a result of the LBT procedure.

Aspect 2: The method of aspect 1, where selecting the minimum sensing duration includes: calculating the minimum sensing duration using a function featuring an inverse relationship between the minimum sensing duration and at least one of the sensing bandwidth or the energy threshold.

Aspect 3: The method of aspect 2, where the function is associated with an upper limit and a lower limit, and possible values for the minimum sensing duration are between the upper limit and the lower limit.

Aspect 4: The method of any of aspects 1 through 3, where selecting the minimum sensing duration includes: selecting the minimum sensing duration from a set of possible minimum sensing durations according to at least one of the sensing bandwidth or the energy threshold.

Aspect 5: The method of aspect 4, where the set of possible minimum sensing durations includes a set of decreasing values, each value of the set of decreasing values corresponding to at least one of a range of sensing bandwidths or a range of energy thresholds.

Aspect 6: The method of any of aspects 1 through 5, where selecting the minimum sensing duration includes: selecting a first value for a minimum length of a sensing period within a sensing slot associated with the LBT procedure; and selecting a second value for a minimum length of one or more sensing periods within a deferral slot associated with the LBT procedure.

Aspect 7: The method of any of aspects 1 through 6, further including: switching from the sensing bandwidth to a second sensing bandwidth; selecting a second minimum sensing duration for the LBT procedure according to the second sensing bandwidth; and performing the LBT procedure for the wireless channel, where performing the LBT procedure includes monitoring the wireless channel for at least the selected second minimum sensing duration.

Aspect 8: The method of any of aspects 1 through 7, further including: switching from the energy threshold to a second energy threshold; selecting a second minimum sensing duration for the LBT procedure according to the second energy threshold; and performing the LBT procedure for the wireless channel, where performing the LBT procedure includes monitoring the wireless channel for at least the selected second minimum sensing duration.

Aspect 9: The method of any of aspects 1 through 8, where the sensing bandwidth is a channel bandwidth or an active bandwidth part (BWP) bandwidth; and the energy threshold is an energy detection threshold or an energy power spectral density threshold.

Aspect 10: An apparatus for wireless communication at a node, including a processing system configured to select a minimum sensing duration for a listen-before-talk (LBT) procedure according to at least one of a sensing bandwidth associated with the LBT procedure or an energy threshold associated with the LBT procedure, a first interface configured to perform the LBT procedure for a wireless channel, where performing the LBT procedure includes monitoring, at the processing system, the wireless channel for at least the selected minimum sensing duration, and the first interface or a second interface configured to selectively output on the wireless channel according to a result of the LBT procedure.

Aspect 11: The apparatus of aspect 10, where selecting the minimum sensing duration further includes: calculating the minimum sensing duration using a function featuring an inverse relationship between the minimum sensing duration and at least one of the sensing bandwidth or the energy threshold.

Aspect 12: The apparatus aspect 11, where the function is associated with an upper limit and a lower limit, and possible values for the minimum sensing duration are between the upper limit and the lower limit.

Aspect 13: The apparatus of any of aspects 10 through 12, where selecting the minimum sensing duration further includes: selecting the minimum sensing duration from a set of possible minimum sensing durations according to at least one of the sensing bandwidth or the energy threshold.

Aspect 14: The apparatus of aspect 13, where the set of possible minimum sensing durations includes a set of decreasing values, each value of the set of decreasing values corresponding to at least one of a range of sensing bandwidths or a range of energy thresholds.

Aspect 15: The apparatus of any of aspects 10 through 14, where selecting the minimum sensing duration further includes: selecting a first value for a minimum length of a sensing period within a sensing slot associated with the LBT procedure, and selecting a second value for a minimum length of one or more sensing periods within a deferral slot associated with the LBT procedure.

Aspect 16: The apparatus of any of aspects 10 through 15, where the processing system is further configured to: switch from the sensing bandwidth to a second sensing bandwidth, select a second minimum sensing duration for the LBT procedure according to the second sensing bandwidth, and the first interface of the second interface is further configured to: perform the LBT procedure for the wireless channel, where performing the LBT procedure includes monitoring, at the processing system, the wireless channel for at least the selected second minimum sensing duration.

Aspect 17: The apparatus of any of aspects 10 through 16, where the processing system is further configured to: switch from the energy threshold to a second energy threshold, select a second minimum sensing duration for the LBT procedure according to the second energy threshold, and the first interface or the second interface is further configured to: perform the LBT procedure for the wireless channel, where performing the LBT procedure includes monitoring, at the processing system, the wireless channel for at least the selected second minimum sensing duration.

Aspect 18: The apparatus of any of aspects 10 through 17, where the sensing bandwidth is a channel bandwidth or an active bandwidth part (BWP) bandwidth, and the energy threshold is an energy detection threshold or an energy power spectral density threshold.

Aspect 19: An apparatus for wireless communication at a node, including: means for selecting a minimum sensing duration for a listen-before-talk (LBT) procedure according to at least one of a sensing bandwidth associated with the LBT procedure or an energy threshold associated with the LBT procedure, means for performing the LBT procedure for a wireless channel, where performing the LBT procedure includes monitoring the wireless channel for at least the selected minimum sensing duration, and means for selectively transmitting on the wireless channel according to a result of the LBT procedure.

Aspect 20: The apparatus of aspect 19, where the means for selecting the minimum sensing duration include: means for calculating the minimum sensing duration using a function featuring an inverse relationship between the minimum sensing duration and at least one of the sensing bandwidth or the energy threshold.

Aspect 21: The apparatus of aspect 20, where the function is associated with an upper limit and a lower limit, and possible values for the minimum sensing duration are between the upper limit and the lower limit.

Aspect 22: The apparatus of any of aspects 19 through 21, where the means for selecting the minimum sensing duration include: means for selecting the minimum sensing duration from a set of possible minimum sensing durations according to at least one of the sensing bandwidth or the energy threshold.

Aspect 23: The apparatus of aspect 22, where the set of possible minimum sensing durations includes a set of decreasing values, each value of the set of decreasing values corresponding to at least one of a range of sensing bandwidths or a range of energy thresholds.

Aspect 24: The apparatus of any of aspects 19 through 23, where the means for selecting the minimum sensing duration include: means for selecting a first value for a minimum length of a sensing period within a sensing slot associated with the LBT procedure, and means for selecting a second value for a minimum length of one or more sensing periods within a deferral slot associated with the LBT procedure.

Aspect 25: The apparatus of any of aspects 19 through 24, further including: means for switching from the sensing bandwidth to a second sensing bandwidth, means for selecting a second minimum sensing duration for the LBT procedure according to the second sensing bandwidth, and means for performing the LBT procedure for the wireless channel, where performing the LBT procedure includes monitoring the wireless channel for at least the selected second minimum sensing duration.

Aspect 26: The apparatus of any of aspects 19 through 25, further including: means for switching from the energy threshold to a second energy threshold, means for selecting a second minimum sensing duration for the LBT procedure according to the second energy threshold, and means for performing the LBT procedure for the wireless channel, where performing the LBT procedure includes monitoring the wireless channel for at least the selected second minimum sensing duration.

Aspect 27: The apparatus of any of aspects 19 through 26, where the sensing bandwidth is a channel bandwidth or an active bandwidth part (BWP) bandwidth, and the energy threshold is an energy detection threshold or an energy power spectral density threshold.

Aspect 28: A non-transitory computer-readable medium storing code for wireless communication at a node, the code including instructions executable by a processor to: select a minimum sensing duration for a listen-before-talk (LBT) procedure according to at least one of a sensing bandwidth associated with the LBT procedure or an energy threshold associated with the LBT procedure, perform the LBT procedure for a wireless channel, where performing the LBT procedure includes monitoring the wireless channel for at least the selected minimum sensing duration, and selectively transmit on the wireless channel according to a result of the LBT procedure.

Aspect 29: The non-transitory computer readable medium of aspect 28, where the instructions to select the minimum sensing duration are executable by the processor to: calculate the minimum sensing duration using a function featuring an inverse relationship between the minimum sensing duration and at least one of the sensing bandwidth or the energy threshold.

Aspect 30: The non-transitory computer readable medium of aspect 29, where the function is associated with an upper limit and a lower limit, and possible values for the minimum sensing duration are between the upper limit and the lower limit.

Aspect 31: The non-transitory computer readable medium of any of aspects 28 through 30, where the instructions to select the minimum sensing duration are executable by the processor to: select the minimum sensing duration from a set of possible minimum sensing durations according to at least one of the sensing bandwidth or the energy threshold.

Aspect 32: The non-transitory computer readable medium of aspect 31, where the set of possible minimum sensing durations includes a set of decreasing values, each value of the set of decreasing values corresponding to at least one of a range of sensing bandwidths or a range of energy thresholds.

Aspect 33: The non-transitory computer readable medium of any of aspects 28 through 32, where the instructions to select the minimum sensing duration are executable by the processor to: select a first value for a minimum length of a sensing period within a sensing slot associated with the LBT procedure, and select a second value for a minimum length of one or more sensing periods within a deferral slot associated with the LBT procedure.

Aspect 34: The non-transitory computer readable medium of any of aspects 28 through 33, where the instructions are further executable by the processor to: switch from the sensing bandwidth to a second sensing bandwidth, select a second minimum sensing duration for the LBT procedure according to the second sensing bandwidth, and perform the LBT procedure for the wireless channel, where performing the LBT procedure includes monitoring the wireless channel for at least the selected second minimum sensing duration.

Aspect 35: The non-transitory computer readable medium of any of aspects 28 through 34, switch from the energy threshold to a second energy threshold, select a second minimum sensing duration for the LBT procedure according to the second energy threshold, and perform the LBT procedure for the wireless channel, where performing the LBT procedure includes monitoring the wireless channel for at least the selected second minimum sensing duration.

Aspect 36: The non-transitory computer readable medium of any of aspects 28 through 35, where the sensing bandwidth is a channel bandwidth or an active bandwidth part (BWP) bandwidth, and the energy threshold is an energy detection threshold or an energy power spectral density threshold.

As used herein, the term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any processor, controller, microcontroller, or state machine. A processor also may be implemented as a combination of computing devices, such as a combination of a DSP and a microprocessor, a set of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, such as one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above also may be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Some features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in some combinations and even initially claimed as such, one or more features from a claimed combination can be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some implementations, the actions recited in the claims can be performed in a different order and still achieve desirable results.

What is claimed is:

1. An apparatus for wireless communication at a node, comprising:
   a processing system configured to:
      select a minimum sensing duration for a listen-before-talk (LBT) procedure according to at least one of a sensing bandwidth associated with the LBT procedure or an energy threshold associated with the LBT procedure;

a first interface configured to:
perform the LBT procedure for a wireless channel, wherein performing the LBT procedure includes monitoring, at the processing system, the wireless channel for at least the selected minimum sensing duration; and the first interface or a second interface configured to:
selectively output on the wireless channel according to a result of the LBT procedure.

2. The apparatus of claim 1, wherein selecting the minimum sensing duration further comprises:
calculating the minimum sensing duration using a function featuring an inverse relationship between the minimum sensing duration and at least one of the sensing bandwidth or the energy threshold.

3. The apparatus of claim 2, wherein the function is associated with an upper limit and a lower limit, and possible values for the minimum sensing duration are between the upper limit and the lower limit.

4. The apparatus of claim 1, wherein selecting the minimum sensing duration further comprises:
selecting the minimum sensing duration from a set of possible minimum sensing durations according to at least one of the sensing bandwidth or the energy threshold.

5. The apparatus of claim 4, wherein the set of possible minimum sensing durations includes a set of decreasing values, each value of the set of decreasing values corresponding to at least one of a range of sensing bandwidths or a range of energy thresholds.

6. The apparatus of claim 1, wherein selecting the minimum sensing duration further comprises:
selecting a first value for a minimum length of a sensing period within a sensing slot associated with the LBT procedure; and
selecting a second value for a minimum length of one or more sensing periods within a deferral slot associated with the LBT procedure.

7. The apparatus of claim 1, wherein:
the processing system is further configured to:
switch from the sensing bandwidth to a second sensing bandwidth;
select a second minimum sensing duration for the LBT procedure according to the second sensing bandwidth; and
the first interface or the second interface is further configured to:
perform the LBT procedure for the wireless channel, wherein performing the LBT procedure includes monitoring, at the processing system, the wireless channel for at least the selected second minimum sensing duration.

8. The apparatus of claim 1, wherein:
the processing system is further configured to:
switch from the energy threshold to a second energy threshold;
select a second minimum sensing duration for the LBT procedure according to the second energy threshold; and
the first interface or the second interface is further configured to:
perform the LBT procedure for the wireless channel, wherein performing the LBT procedure includes monitoring, at the processing system, the wireless channel for at least the selected second minimum sensing duration.

9. The apparatus of claim 1, wherein:
the sensing bandwidth is a channel bandwidth or an active bandwidth part (BWP) bandwidth; and
the energy threshold is an energy detection threshold or an energy power spectral density threshold.

10. A method for wireless communication at a node, comprising:
selecting a minimum sensing duration for a listen-before-talk (LBT) procedure according to at least one of a sensing bandwidth associated with the LBT procedure or an energy threshold associated with the LBT procedure;
performing the LBT procedure for a wireless channel, wherein performing the LBT procedure includes monitoring the wireless channel for at least the selected minimum sensing duration; and
selectively transmitting on the wireless channel according to a result of the LBT procedure.

11. The method of claim 10, wherein selecting the minimum sensing duration comprises:
calculating the minimum sensing duration using a function featuring an inverse relationship between the minimum sensing duration and at least one of the sensing bandwidth or the energy threshold.

12. The method of claim 11, wherein the function is associated with an upper limit and a lower limit, and possible values for the minimum sensing duration are between the upper limit and the lower limit.

13. The method of claim 10, wherein selecting the minimum sensing duration comprises:
selecting the minimum sensing duration from a set of possible minimum sensing durations according to at least one of the sensing bandwidth or the energy threshold.

14. The method of claim 13, wherein the set of possible minimum sensing durations includes a set of decreasing values, each value of the set of decreasing values corresponding to at least one of a range of sensing bandwidths or a range of energy thresholds.

15. The method of claim 10, wherein selecting the minimum sensing duration comprises:
selecting a first value for a minimum length of a sensing period within a sensing slot associated with the LBT procedure; and
selecting a second value for a minimum length of one or more sensing periods within a deferral slot associated with the LBT procedure.

16. The method of claim 10, further comprising:
switching from the sensing bandwidth to a second sensing bandwidth;
selecting a second minimum sensing duration for the LBT procedure according to the second sensing bandwidth; and
performing the LBT procedure for the wireless channel, wherein performing the LBT procedure includes monitoring the wireless channel for at least the selected second minimum sensing duration.

17. The method of claim 10, further comprising:
switching from the energy threshold to a second energy threshold;
selecting a second minimum sensing duration for the LBT procedure according to the second energy threshold; and performing the LBT procedure for the wireless channel, wherein performing the LBT procedure includes monitoring the wireless channel for at least the selected second minimum sensing duration.

18. The method of claim 10, wherein:
the sensing bandwidth is a channel bandwidth or an active bandwidth part (BWP) bandwidth; and
the energy threshold is an energy detection threshold or an energy power spectral density threshold.

19. An apparatus for wireless communication at a node, comprising:
means for selecting a minimum sensing duration for a listen-before-talk (LBT) procedure according to at least one of a sensing bandwidth associated with the LBT procedure or an energy threshold associated with the LBT procedure;
means for performing the LBT procedure for a wireless channel, wherein performing the LBT procedure includes monitoring the wireless channel for at least the selected minimum sensing duration; and
means for selectively transmitting on the wireless channel according to a result of the LBT procedure.

20. The apparatus of claim 19, wherein the means for selecting the minimum sensing duration comprise:
means for calculating the minimum sensing duration using a function featuring an inverse relationship between the minimum sensing duration and at least one of the sensing bandwidth or the energy threshold.

21. The apparatus of claim 20, wherein the function is associated with an upper limit and a lower limit, and possible values for the minimum sensing duration are between the upper limit and the lower limit.

22. The apparatus of claim 19, wherein the means for selecting the minimum sensing duration comprise:
means for selecting the minimum sensing duration from a set of possible minimum sensing durations according to at least one of the sensing bandwidth or the energy threshold.

23. The apparatus of claim 22, wherein the set of possible minimum sensing durations includes a set of decreasing values, each value of the set of decreasing values corresponding to at least one of a range of sensing bandwidths or a range of energy thresholds.

24. The apparatus of claim 19, wherein the means for selecting the minimum sensing duration comprise:
means for selecting a first value for a minimum length of a sensing period within a sensing slot associated with the LBT procedure; and
means for selecting a second value for a minimum length of one or more sensing periods within a deferral slot associated with the LBT procedure.

25. The apparatus of claim 19, further comprising:
means for switching from the sensing bandwidth to a second sensing bandwidth;
means for selecting a second minimum sensing duration for the LBT procedure according to the second sensing bandwidth; and
means for performing the LBT procedure for the wireless channel, wherein performing the LBT procedure includes monitoring the wireless channel for at least the selected second minimum sensing duration.

26. The apparatus of claim 19, further comprising:
means for switching from the energy threshold to a second energy threshold;
means for selecting a second minimum sensing duration for the LBT procedure according to the second energy threshold; and
means for performing the LBT procedure for the wireless channel, wherein performing the LBT procedure includes monitoring the wireless channel for at least the selected second minimum sensing duration.

27. The apparatus of claim 19, wherein:
the sensing bandwidth is a channel bandwidth or an active bandwidth part (BWP) bandwidth; and
the energy threshold is an energy detection threshold or an energy power spectral density threshold.

28. A non-transitory computer-readable medium storing code for wireless communication at a node, the code comprising instructions executable by a processor to:
select a minimum sensing duration for a listen-before-talk (LBT) procedure according to at least one of a sensing bandwidth associated with the LBT procedure or an energy threshold associated with the LBT procedure;
perform the LBT procedure for a wireless channel, wherein performing the LBT procedure includes monitoring the wireless channel for at least the selected minimum sensing duration; and
selectively transmit on the wireless channel according to a result of the LBT procedure.

29. The non-transitory computer-readable medium of claim 28, wherein the instructions to select the minimum sensing duration are executable by the processor to:
calculate the minimum sensing duration using a function featuring an inverse relationship between the minimum sensing duration and at least one of the sensing bandwidth or the energy threshold.

30. The non-transitory computer-readable medium of claim 28, wherein the instructions to select the minimum sensing duration are executable by the processor to:
select the minimum sensing duration from a set of possible minimum sensing durations according to at least one of the sensing bandwidth or the energy threshold.

* * * * *